United States Patent [19]

Long et al.

[11] Patent Number: 4,532,559
[45] Date of Patent: Jul. 30, 1985

[54] APPARATUS FOR DECODING PHASE ENCODED DATA

[75] Inventors: Charles C. Long, Holliston; David M. Lounsbury, Boston; Richard R. Curtin, Milford, all of Mass.

[73] Assignee: Prime Computer, Inc., Natick, Mass.

[21] Appl. No.: 466,332

[22] Filed: Feb. 14, 1983

[51] Int. Cl.³ .............................................. G11B 5/09
[52] U.S. Cl. ........................................ 360/51; 360/43
[58] Field of Search .................... 360/43, 45, 46, 51

[56] References Cited

U.S. PATENT DOCUMENTS

| | | | |
|---|---|---|---|
| 4,037,257 | 7/1977 | Chari | 360/51 |
| 4,146,743 | 3/1979 | Raynham | 360/51 |
| 4,365,210 | 12/1982 | Harrington et al. | 360/51 |

Primary Examiner—Vincent P. Canney
Attorney, Agent, or Firm—Wolf, Greenfield & Sacks

[57] ABSTRACT

Apparatus is disclosed for reading phase encoded digital data from a nine-track magnetic tape which apparatus includes timing circuitry for deriving a clock signal from the recorded data. A portion of the timing circuitry is associated with each track on the tape and automatically accommodates, without generating errors, phase changes in the derived clock signal in that track caused by speed variations in the magnetic tape transport and due to bit shifts caused by certain data patterns.

Tape transport speed variations are sensed and the derived clock rate is corrected by a digital phase-locked loop which uses a counter that is clocked at a constant rate to determine the timing "window" during which the circuitry looks for signal transitions on the magnetic tape. A running average of the count remaining in the counter at the time when a transition actually occurs is used to adjust the counter starting value until equilibrium is established.

The circuitry accommodates clock signal phase changes caused by bit shifting by calculating an expected arrival time for a data transition and varying the width of the timing window depending on whether the data transition is received either prior to or subsequent to the expected arrived time.

39 Claims, 17 Drawing Figures

SPEED CONTROL LOGIC

Fig.5 GATE LOGIC

SHEET 1

SHEET 2

APPARATUS FOR DECODING PHASE ENCODED DATA

FIELD OF THE INVENTION

This invention relates to apparatus for reproducing digital data from a storage medium and, more particularly, for reproducing phase encoded digital data from magnetic tape.

BACKGROUND OF THE INVENTION

There are presently a number of methods for storing and retrieving digital data. For example, digital data may be stored on magnetic disks, magnetic tape, in optical systems or in semiconductor memories. Each of these storage devices has at least two internal states which can be used to represent the binary values of the digital information. Before the data can be stored in the device, it must first be encoded using unique combinations of two or more of these internal states.

For example, digital data may be stored on magnetic tape by using the direction of alignment of magnetic domains on the tape to represent digital data values. One common method of aligning the magnetic domains is to use align the domains perpendicular to the magnetic head which "writes" the data on the tape. A binary value of "0" is represented by aligning the north pole of the magnetic domain either facing toward the write head or away from the write head. A binary "1" is represented by aligning the domain in the opposite direction. When domains aligned in this fashion pass under a reading head in well-known fashion, the reading circuitry produces output voltages of different values which then can be interpreted as binary "1"s or "0"s.

It is also possible to record data on magnetic tape using transitions between a domain in one direction and a domain in the other to represent data values rather than the absolute direction of the domain alignment. This method of encoding is called phase encoding. The domain transitions on the magnetic tape result in transitions in the output signal produced by the read heads from one voltage level to another voltage level. An output signal transition in one direction, for example, from high voltage to low voltage, is used to represent a binary "0". A transition in the other direction (low voltage to high voltage) is used to represent a binary "1". With such a transition recording scheme when digital data with successive data bits having the same binary values such as "1111" or "0000" is recorded on the tape, an extra transition, called a "phase transition" must be located half way between the data transitions to allow the signal to return to the proper level, either high or low, so that the next succeeding data transition can occur in the proper direction.

One advantage of phase encoding is that it is "self-clocking". More specifically, it is necessary for the circuitry which reads the data from the magnetic tape to synchronize approximately to the data rate of the stored data so that the reading circuitry can examine the magnetic tape at the proper locations to obtain the data transitions. In some encoding schemes, a separate clock track is used. The clock track contains clock signals which are recorded at locations on the tape corresponding to the location of the data signals. The clock signals can be read and used by the reading circuitry to develop a time period or "window" during which the reading circuitry examines the tape for a corresponding data level transition.

In a phase encoding arrangement, the data transitions occur with sufficient regularity that a clock signal can be derived directly from the data in a well-known manner by using a phased-lock loop, matched filter circuitry or other well-known apparatus. There are two well-known problems which interfere with the derivation of a clocking signal from phase encoded data using prior art circuitry by causing a change in the apparent frequency of the recorded data.

One of these problems is "bit shifting". Theoretically, the data transitions should occur at either of two frequencies, depending on whether there are phase transitions present or not. However, when certain data patterns are recorded, due to well-known magnetic properties of magnetic recording media and the characteristics of reproduction of a digital signal from such media, the locations of the data transitions will often shift from their theoretical locations. It is possible for this shift to occur so rapidly that the reading circuitry, using the derived clocking signal, will not have sufficient time to adjust the clocking signal to synchronize with the shifted data. When this happens an error or data "dropout" occurs.

In addition, to bit shift, variations in the mechanical speed of the tape transport may cause a variation in the apparent frequency of the recorded data. Therefore, some mechanism must be used to change the derived clock frequency to avoid read errors.

Accordingly, prior art systems have been developed in order to compensate the derived clocking rate for bit shift and speed variations of the tape tranport. In particular, although the normal phase-locked loop circuitry which is used to derive the clock signals from the recorded data can compensate for the slow changes caused by speed variations in the magnetic tape transport, bit shifting is often so severe that the loop becomes unsynchronized. In order to avoid this problem, prior art devices have utilized an averaging arrangement in which the correction factor which is used to reset the phase-locked loop is derived from an average of the phase differences over a predetermined number of preceding bit times. Since bit shift usually affects only one or two bits and does not affect the overall data rate, this averaging technique is effective to remove the abberations caused by bit shift if an average is taken over a sufficiently long time to cause the bit shift errors to cancel out. Unfortunately, if averaging is done over a sufficient time to eliminate bit shift, the phase-locked loop may not be able to properly track speed variations in the magnetic tape transport.

Still other prior art circuits (of which U.S. Pat. No. 3,827,078 is an example) have attempted to remove the effects of bit shifting by detecting the phase error between the raw data recovered from the recording medium and the clock signals generated by the phase-locked loop and dynamically adjusting the width of the data recovery window in response to the magnitude of the error. However, this circuitry, while compensating for bit shift cannot compensate for speed variation errors.

It is therefore an object of the present invention to provide a data storage and retrieval system which has fewer data recovery errors than prior systems.

It is another object of the present invention to provide a data storage and retrieval system which can compensate for data frequency variations in the storage system.

It is yet another object of the present invention to provide a data retreival system which can compensate for bit shifts occurring in the storage system.

It is a further object of the present invention to provide a data retreival system in which data frequency variations on each track of multitrack magnetic tape can be accomodated independently.

SUMMARY OF THE INVENTION

The foregoing objects are achieved and the foregoing problems are solved in one illustrative embodiment of the invention in which two interconnected timing loops detect and compensate for data frequency variations which occur when phase encoded data is read.

More particularly, one of the timing loops is a phase-locked loop which generates a predicted bit time interval between successive data transitions. After each data transition occurs, the prediction of the bit time interval until the next transition is changed by a compensation factor which is based on the algebraic sign of a running average of the difference between the actual transition time and the predicted time for the current bit time and the immediately preceeding bit time. In order to prevent bit shifts from seriously disrupting the accuracy of the predicted time intervals, the correction factor is limited to a small percentage of the overall bit time.

The second timing loop separates data transitions from phase transitions and compensates for bit shifts. This second loop utilizes the predicted bit time from the first timing loop to generate a window during which data transitions are expected to occur. Any transition occurring outside the window is assumed to be a phase transition. Bit shifts are corrected by adjusting the width of the window depending on whether the previous transition arrived either before, at, or after the predicted time.

More specifically, the phase-locked loop consists of a counter whose starting count is programmable. The counter counts down under a constant series of clock pulses to determine a predicted time of detection for the next data transition. When the transition occurs, the count remaining in the counter is indicative of the difference between the actual time of arrival of the data transition and its predicted time of arrival. The sign of the running average of the counts remaining in the counter for the current transition and for the previous data transition is used to adjust the starting count for the next transition in order to correct for tape transport speed variations.

The bit shift correction circuitry consists of another counter with a programmable starting count. This second counter determines the opening time of the window time interval during which data transitions are detected. The starting count of the second counter is set to a percentage of the starting count of the first counter, which percentage varies depending on whether the previous data transition was bit shifted or not. In particular, if a data transition occurs either at or before its predicted time, the window width for the next transition is set to 75% of the predicted bit time. This width insures that the read circuitry will examine the read head output signal at a time 25% prior to the expected transition arrival time so that jitter and small bit shifts will not cause lost data. Alternatively, if a data transition arrives after its predicted time, the window width for the next transition is adjusted to be 75% minus the amount of time the data transition occurs after its predicted time. Therefore, the circuitry will begin looking for the next transition at an earlier time than normal and will detect an early transition which often follows such a delayed transition.

A special condition occurs when a phase transition is detected. Since phase transitions are not usually affected by bit shifts and occur at a time approximately midway into the bit cell, the window width is immediately recalculated to open at a time 25% of the predicted width after the phase transition is detected so that the window opens at about 75% of the predicted time from the last data transition.

DETAILED DESCRIPTION

Figure 1:
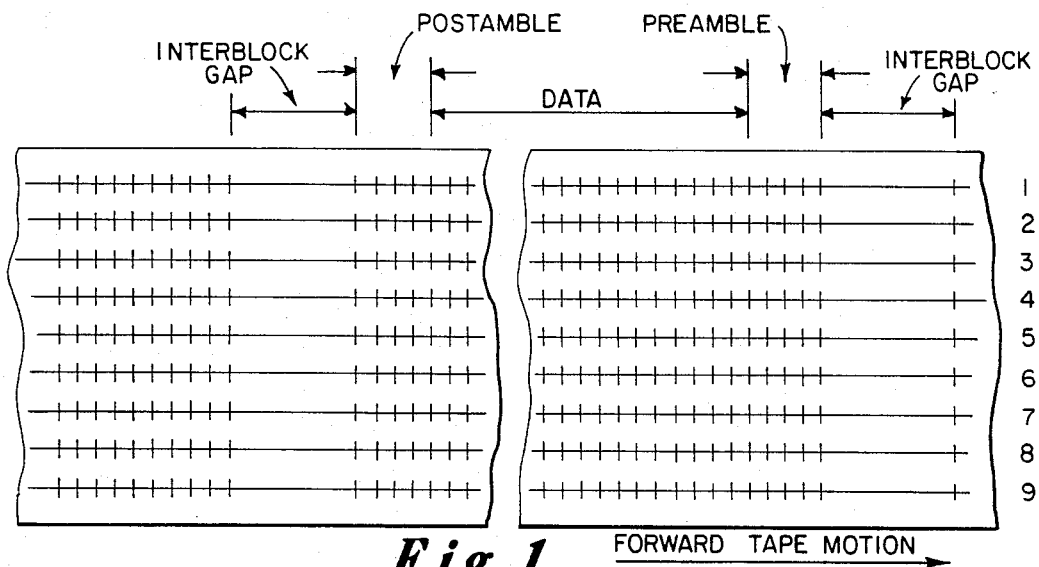
FIG. 1 illustrates a section of nine track magnetic tape on which data has been recorded in a well-known fashion.

FIG. 1 shows a section of a nine track magnetic tape which has been recorded with digital data arranged in blocks according to the well-known ANSI recording standards. In accordance with these standards, an eight-bit digital word is recorded along a line perpendicular to the direction of travel of the tape—one bit in each of eight tracks. The remaining track (usually track number 4) is used to record a parity bit which is used in a well-known fashion for error detection and correction of the data contained in the other eight tracks.

Along the length of the tape, digital data is recorded in "records" or "blocks" and each block is separated by an interblock gap in which no data is recorded on the tape. Each record consists of a preamble, followed on the tape by data and a postamble. The preamble contains synchronizing information which allows the reading circuitry to derive a clocking signal that is synchronized to the data before data is actually received. The exact format of the preamble is determined by the encoding scheme which is used for the data. More particularly, for phase-encoded data, in each track of the tape the preamble consists of forty consecutive "0's" followed by a single "1". The trailing "1" is used, as will be hereinafter explained, for correcting for data skew.

The preamble is followed by the actual data which may vary in length from two bytes to many hundreds of bytes. The data, in turn, is followed by a postamble which is used to indicate the end of the block. The postamble, in the case of phase-encoded data, also consists of a "1" followed by forty consecutive "0"s.

The physical beginning and physical end of the tape are also marked with special physical markers so that the tape transport and reproducing circuitry can determine when the end or beginning of a tape has been reached. These markers are well-known and are not important for an understanding of the invention.

Figure 2:
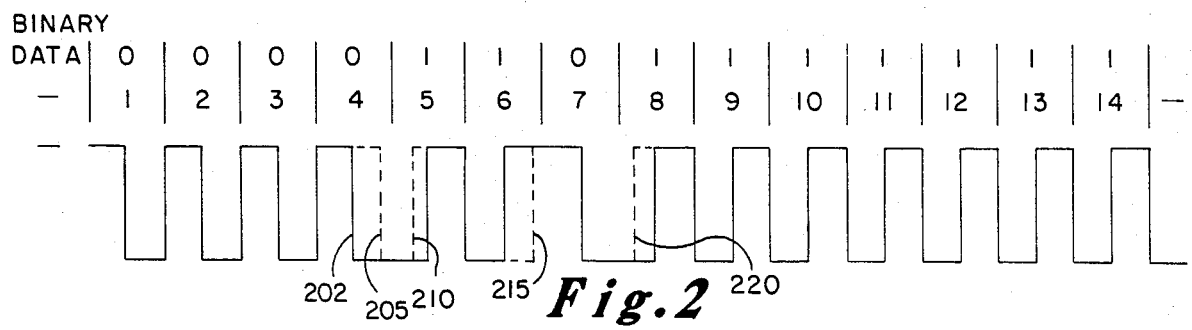
FIG. 2 is a diagram of an idealized waveform of information which might be stored in one track of the tape shown in FIG. 1.

FIG. 2 shows an idealized waveform that would be developed by reading circuitry passing over digital information recorded in one track of the tape shown in FIG. 1. The actual waveform, which has been encoded with the phase-encoding technique, would be somewhat distorted from that shown in FIG. 2 due to the well-known characteristics of magnetic recording, noise and other factors. The binary data which has been recorded is the 14-bit sequence "00001101111111" shown in the first line of the figure. The digital information is recorded along the length of the tape in a series of bit cells labelled 1–14 in FIG. 2.

With the particular reading circuitry which generated the waveform shown, a transition of the signal from one level to another in a bit cell indicates the value of the data stored in that bit cell. For example, in bit cell number 1, the transition of the signal from high-to-low is interpreted by the reading circuitry as representing a binary "0". Similarly, in bit cell number 5, a transition from the signal from low-to-high signifies a binary value of "1". When consecutive binary "0"s are recorded, as shown in bit cells 1–4, an additional transition must be placed at the bit cell boundary, for example, the boundary between bit cells 1 and 2. This extra transition is generally called a phase transition and does not signify data information. It merely allows the signal level to return to the proper value so that the next data transition occurs in the proper direction. A similar phase transition must be added between pairs of consecutive binary "1"s, as shown in bit cells 9–14. The presence of the additional phase transitions causes the data frequency for consecutive bits of the same binary value to be approximately twice the data frequency which occurs during a digital word which has bits of alternating binary value.

In accordance with well-known properties of magnetic recording media and reproducing circuitry, this change in data frequencies causes a phenomenon called "bit shift". A bit shift occurs, for example, in bit cells 4 and 5 shown in FIG. 2 when the data value changes from consecutive "0"s to a following "1" in bit cell 5. With this data pattern, the signal transition in bit cell 4 which would normally occur in approximately the center of the cell (as shown in the solid line 202) actually occurs somewhat later in time as shown by the dotted line 205. The time delay due to the bit shift phenomenon can be so severe that recording circuitry which examines in the vicinity of the cell center for a data transition does not detect the shifted transition, thus a data error or "dropout" occurs.

Similarly, a data transition which represents a binary "1" in bit cell 5 can be shifted so that it occurs sooner than it would normally occur as shown by the dotted line 210 in bit cell 5. As with the late transition in bit cell 4, this early transition shift may be so severe that the recording circuitry produces an error.

A similar problem occurs with a change between consecutive "1"s shown in bit cells 5 and 6 and a trailing "0" shown bit cell 7. In this case, the transition which represents the binary "1" (shown in bit cell 6) is delayed as shown by the dotted line 215 and the transition representing the binary "1" in bit cell 8 occurs early as shown by the dotted line 220. In general, a late transition will be preceded by a phase transition and followed by a data transition and an early transition will be preceded by a data transition and followed by a phase transition. The amount of the shift depends upon the reading circuitry, noise and the recording density of the digital information on the tape.

Although bit shifts may be severe they usually affect only a small number of bits and tend to equalize over time. In addition, phase transitions are not affected and thus may be used to resynchronize the clock derivation circuitry. Another type of data frequency variation is caused by mechanical speed variations in the tape recorder transport mechanism. Since the digital information has been recorded at approximately equal intervals along the tape if the writing circuitry is operating properly, the frequency of the data detected by the reading circuitry depends upon the speed of the tape as it passes over the read head. In most tape recorders the variation in speed is controlled but may still be significant. A recorder speed variation causes the data frequency to change slowly with respect to the bit rate but the change may not be self-equalizing over time and may become severe over a long period of time if not corrected.

Figure 3:
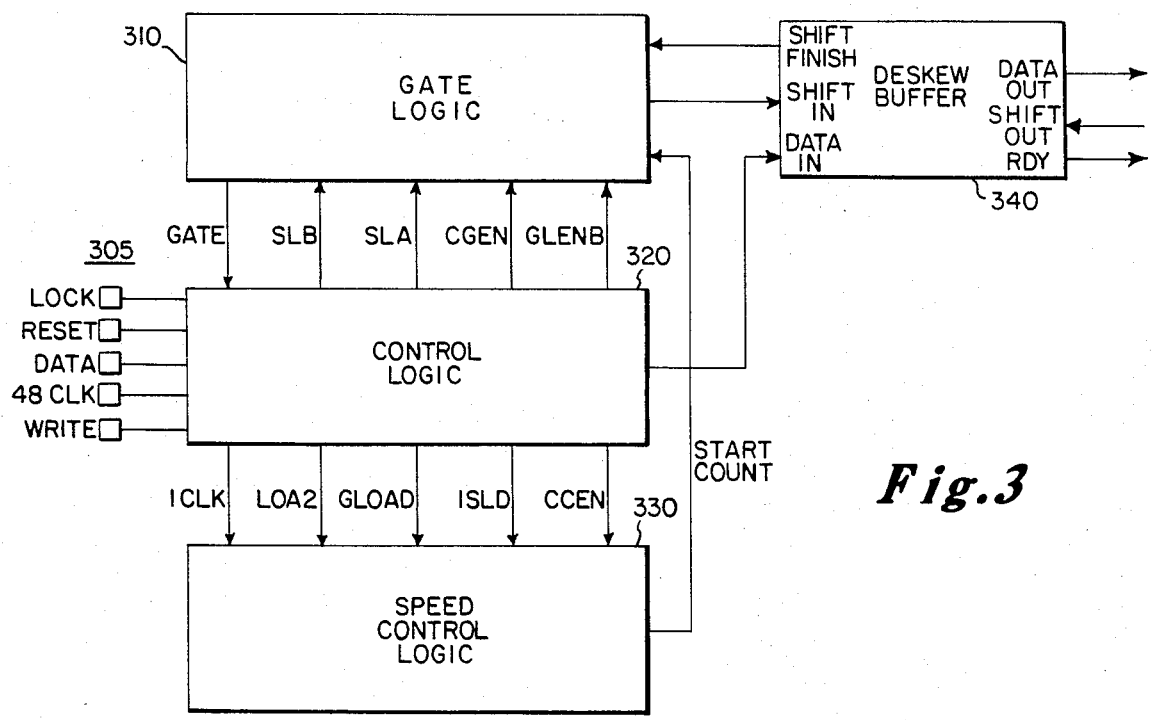
FIG. 3 is a block schematic diagram of the reading circuitry of the illustrative embodiment.

FIG. 3 shows a block schematic diagram of the major components of an illustrative phase-encoded data reading system in accordance with the present invention which can detect and compensate for both tape recorder speed variations and bit shift. The illustrative circuitry is controlled by signals appearing on input terminals 305. These input signals may be provided by other external control circuitry or by a computer which may control the circuitry. The operation of a computer in controlling a tape drive controller is well known and will not be described further herein. The incoming control signals are processed, as will hereinafter be described, by control logic 320 which, in turn, controls gate logic 310 and speed control logic 330 by means of various control signals set forth in FIG. 3.

Speed control logic 330, which will be described in detail, contains a phase-locked loop which effectively derives a clock signal from the recorded data. An output is provided by circuit 330 during each bit time in the form of a binary number whose magnitude indicates the predicted time of the next data transition. In accordance with one aspect of the invention, this binary number is adjusted to compensate for tape transport speed variations. The number is provided to gate logic 310 which is also controlled by signals produced by control logic 320 to generate a time interval or "window" during which the incoming data signal is examined for a data transition. The number received from speed logic 310 is converted by gate logic 330 into a predicted transition arrival time by loading a counter with the number and counting the counter down by means of a clock signal with a constant predetermined frequency. The output of gate logic 310 is a "gate" signal which, when asserted, signifies the beginning of the window time period and is provided to control logic 320. In response to the gate signal, control logic 320 transfers data from the DATA terminal of terminals 305 into deskew buffer 340.

In accordance with another aspect of the present invention, bit shift is accomodated without introducing data errors by adjusting the timing of the gate signal depending on whether the previous data transition arrived either before, at, or after the predicted time. More specifically, if a data transition occurs at the predicted time, the window opening time for the next transition is set to 75% of the predicted bit time. This gate starting time insures that the read circuitry will examine the data signal at a time 25% prior to the expected data transition arrival time so that timing jitter will not cause lost data. Alternatively, if a data transition arrives after the predicted time, the gate opening time for the next transition is adjusted to be 75% minus the amount of time the data transition occurs after the predicted time. Therefore, the read circuitry will begin looking for the next transition at an earlier time (measured from the late transition) than normal. Since the transition was late, however, the read circuitry will actually begin looking for a data transition at approximately the same time as it would have started if the previous transition was on time. Thus, the read circuitry will detect an early transition which often follows such a delayed transition. If a data transition occurs prior to the predicted time, the gate opening time is set to 25% of the predicted bit time.

Deskew buffer 340 is controlled by external circuitry (not shown) in a well-known manner to correct for mechanical and electrical skew. Skew results when the data is not recorded in a line perpendicularly across the tape and results in some tracks receiving data bits before other tracks receive corresponding bits. In general, to correct for skew, buffer 340 is loaded with the digital information appearing in the preamble of each data block as the data is read from the corresponding magnetic tape track. The binary "0"s in the preamble are shifted through the deskew buffer until the trailing one is detected, at which point the shifting is halted. When a "1" bit has been detected in deskew buffers associated with each of the nine tracks, the data is shifted out of the deskew buffers in synchronism so that an entire word is shifted out at once. Any time differences between the reading of the data bits of a single data word is thereby eliminated.

More particularly, buffer 340 is controlled by gate logic 310 so that successive bits of data on the corresponding track are shifted into buffer 340 under control of the SHIFT IN signal. After the first bit has been shifted into buffer 340, buffer circuitry (not shown) asserts the ready (RDY) lead to indicate to the external circuitry that the buffer for that channel has data in it. A similar operation occurs with the deskew buffers associated with each of the other remaining eight channels. Transfer of data out of the deskew buffers is controlled by the external circuitry by means of the SHIFT OUT command.

At the start of a data read operation the external control circuitry or computer (not shown) operates the associated tape transport so that the magnetic tape is brought up to a speed which is approximately 50% of its final reading speed. The read circuitry shown in FIG. 3 is then initialized by the external circuitry which places a "low" signal pulse on the RESET input terminal. This "low" signal clears internal registers and places gate logic 310, control logic 320 and speed control logic 330 into the condition for detecting the start of data. This resetting operation occurs during the interblock gap so that no data is lost during the reset operation.

The data signal recorded on the magnetic tape is detected and processed by well-known magnetic transducers or heads which develop an electrical waveform in response to the recorded information on the tape. This signal is processed by conventional pulse shaping circuitry which amplifies the signal produced by the read head, squares the resulting waveform and detects signal thresholds to produce digitized data signals. The digitized data signal is presented to the illustrative reading circuitry on the DATA pin of terminals 305.

After the magnetic recording tape has reached its final speed, the external control circuitry also places a master clock signal on pin 48CLK of terminals 305, which clock signal regulates and times the operation of the control, speed and gate circuitry. For normal recording speed of 125 inches per second this signal is a squarewave of approximately 10 megahertz frequency and is selected so that 48 clock pulses occur during each bit cell period.

The data information on the DATA pin passes into control logic 320 which detects both phase and data transitions as will be hereinafter described.

When such transitions are detected, a signal is asserted by control logic 320 on the TRACKX line to indicate to the external control circuitry that transitions are occurring on the associated data track. The external control logic uses the TRACKX signals generated by all nine tracks to determine what action must be taken. In particular, the external control logic must determine whether the start of a data record, a file mark or noise is being detected. This decision is made in a straightforward manner by examining all nine tracks (during the preamble) to detect a coded signal. If a record or a file mark has not been detected, the external logic applies another reset pulse, via the RESET pin of terminals 305, to the control logic associated with each of the nine tracks, waits for two bit times and starts looking for information on the TRACKX signal lines again. This process is repeated until a record, file mark or a noise record is detected by the external control circuitry.

After the start of a preamble has been detected by the external control logic a "high" signal is placed by the external logic on the LOCK pin of terminals 305 and the corresponding read circuitry associated with each of the other eight tracks. The presence of the LOCK signal will cause the phase-locked loop in speed circuitry 330 to begin tracking tape speed variations after the next data transition is detected. In particular, after each data transition is detected an "update" cycle is performed to change the predicted bit time to a new value in accordance with speed variations. The external control circuit then waits a predetermined time which is sufficient for the phase-locked loop to achieve synchronization and removes the LOCK signal. When the next data transition following the removal of the LOCK signal is detected, gate logic 310 is enabled and the transfer of data to deskew buffer 340 starts. The signal on the TRACKX line will be reasserted by control circuitry 320 and when data begins entering buffer 340, the deskew buffer RDY line will be asserted. Alternatively, if an error is detected, the TRACKX line will remain "low", the RDY line will be forced to its nonasserted state and the deskew buffer will be filled with "0"s.

The illustrative circuitry is also arranged so that a read operation can be performed directly after a write operation to check the operation of the write circuitry. In such an operation, the magnetic tape is brought up to 50% of its final speed by the tape transport and a reset pulse is sent via the RESET pin to the read circuitry as described above in connection with the read operation. At this point, a signal is placed on the WRITE pin of terminals 305 which causes control logic 320 to disable the speed control logic 330. The data which has just been written is immediately read and applied, after a short delay (caused by a physical space between the read and write heads), to the DATA pin of terminals 305 to control logic 320. Because it is disabled the internal phase-locked loop in the read circuitry does not track any data speed variations, instead, the output of the circuit is forced to a predetermined number. Therefore, gross malfunctions or bit shifts caused by the write circuitry will cause an error when the data is read by indicating to the external control logic that the write circuitry is malfunctioning.

OPERATION OF THE SPEED CONTROL LOGIC

Figure 4:
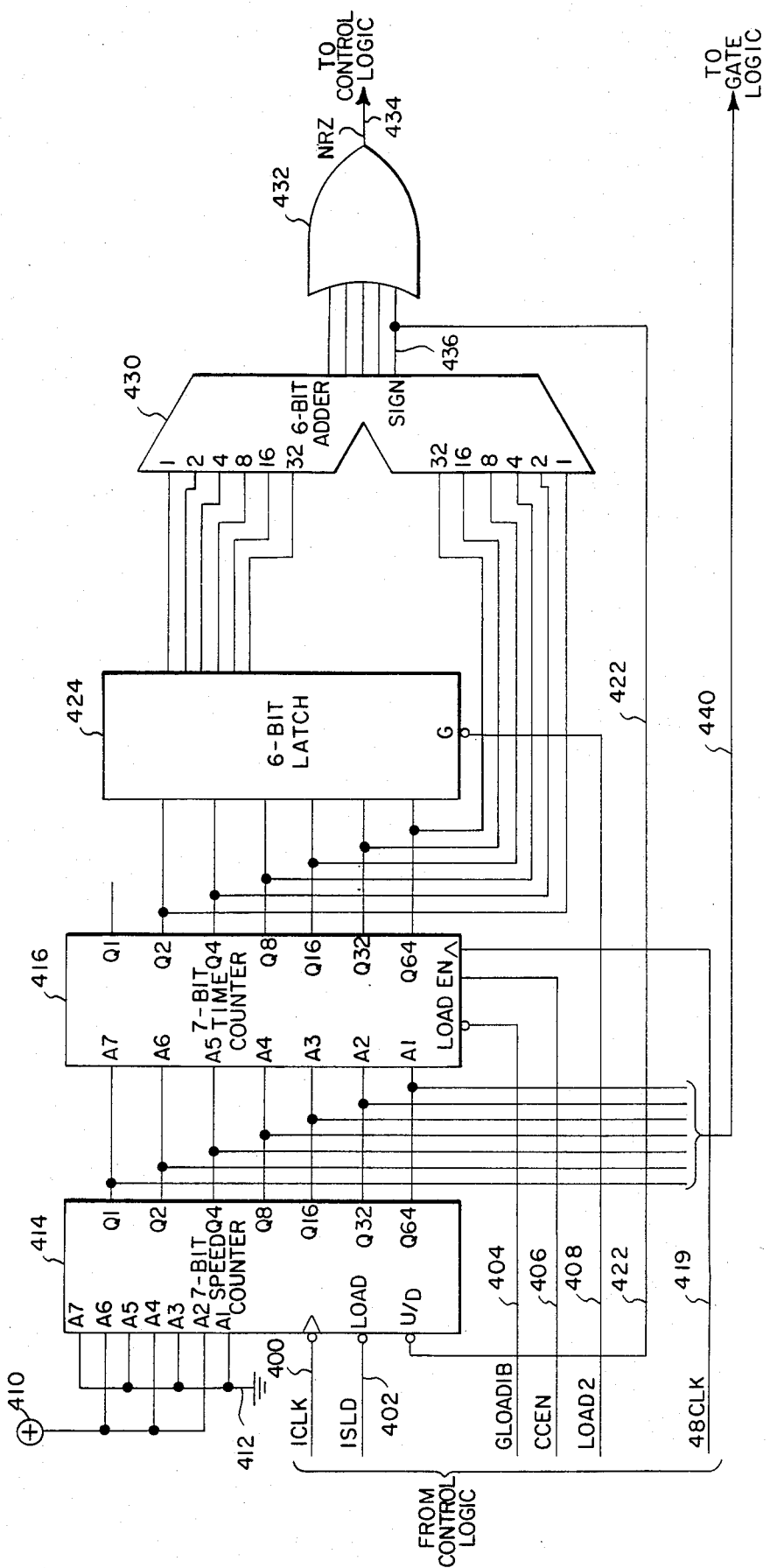
FIG. 4 is a block schematic diagram of the phase-locked loop circuitry which compensates for speed variations in the tape transport.

The speed control logic is shown in block diagram form in FIG. 4. The circuitry consists of two seven-bit counters (414 and 416), a six-bit latch 424 and a six-bit adder circuit 430, which are connected in a feedback loop that is the digital equivalent of a phase-locked loop. The output of this phase-locked loop is a count number developed at the output of counter 414 and provided, via bus 440, to the gate logic as will be hereinafter described. The magnitude of this number is indicative of the predicted time duration from the last data transition to the next data transition based on calculations on the previous bit times.

The speed control logic is controlled by signals generated from the control logic, as will be hereinafter described. These signals include a clock signal ICLK on lead 400, load signals ISLD on lead 402 and GLOAD1B on lead 404 and enable signals CCEN on lead 406 and LOAD2 on lead 408. In addition to the count number on bus 440, the circuitry provides an output NRZ on lead 434 to the control logic to indicate that the data transition which has just been detected did not occur at the predicted time.

Figure 8:
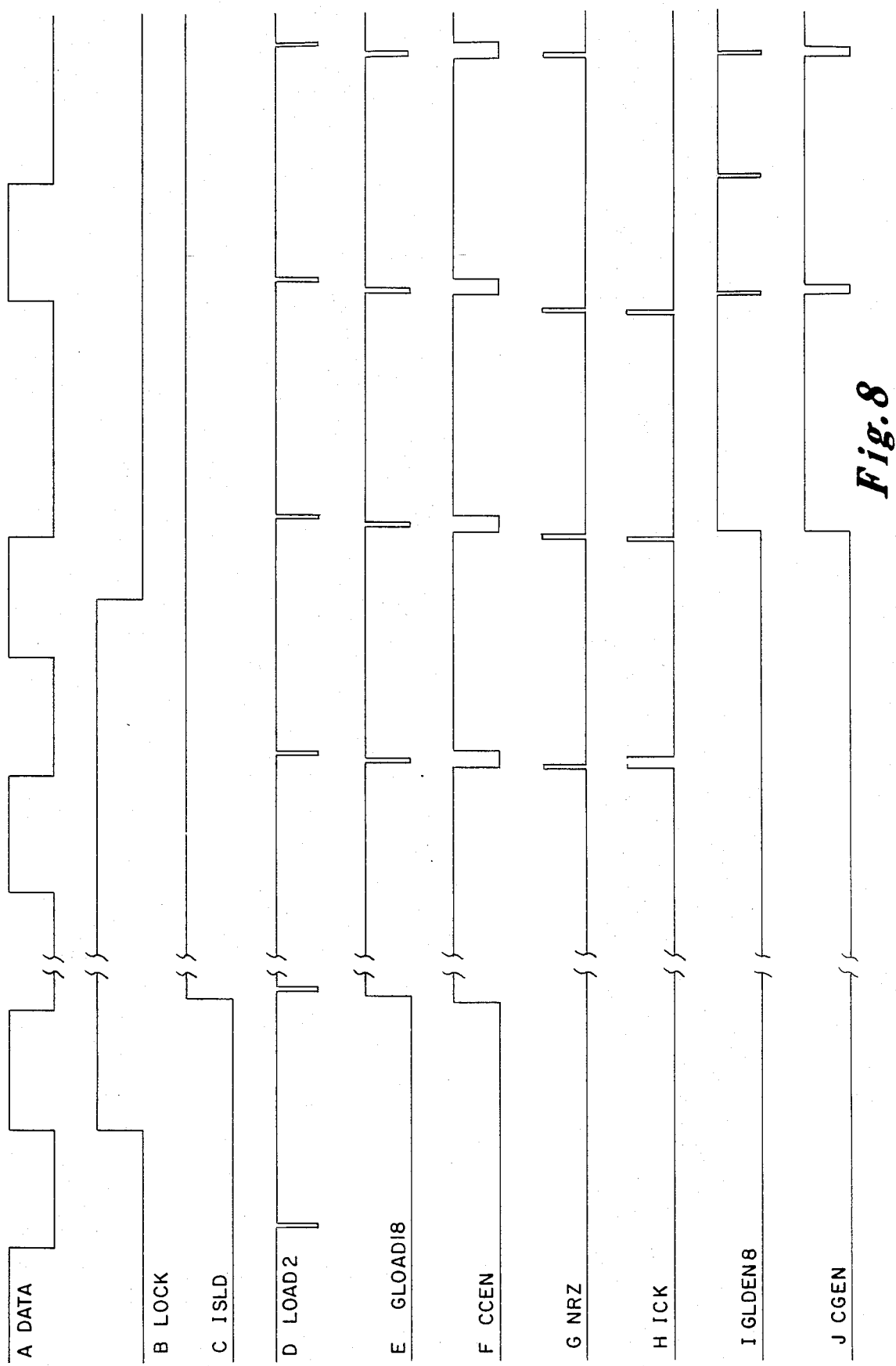
FIG. 8, consisting of A-J, is a diagram of electrical waveforms at selected points in the circuits shown in FIGS. 4-7.

The relations of the various signals referred to above are shown in FIG. 8 which shall be referred to in conjunction with FIG. 4. Line A of FIG. 8 shows a sample incoming data waveform. The leftmost part of the waveform illustrates a preamble data waveform (consecutive "0"s) and the rightmost part of the waveform illustrates a sample data pattern consisting of "1"s and "0"s. Line B of FIG. 8 shows the LOCK signal provided by the external circuitry. As previously mentioned, prior to the assertion of the LOCK signal by the external control logic, the speed control logic does not track data speed variations. Instead, the output of speed counter 414 is forced to a fixed number and bit time counter 416 is disabled. Thus, the speed count value applied to the gate logic via bus 440 is fixed. The 48CLK signal is not shown but consists of approximately 48 clock pulses per data bit.

More particularly, prior to the assertion of the LOCK signal by the external control logic, the control logic applies a "low" signal to ISLD lead 402 (FIG. 8, line C). This signal is applied to the load input of counter 414. Counter 414 is a conventional seven-bit binary up/down counter which, in response to the "low" signal at its load input, loads the digital word appearing at its inputs A1–A7 into its internal stages which digital word thereupon appears at outputs Q1–Q64. When the load input is held "low" the counter does not count in response to a clock signal ICLK applied to its clock input on lead 400 but remains in the load condition. The inputs of counter 414 are permanently connected to voltage source 410 and ground 412 so that counter 414 is loaded with the binary number 0101010 (decimal 42) when lead ISLD is held "low". Starting from an initial loaded count value, the counter will either increment or decrement its count in response to clock signals on the ICLK lead depending on the value of the signal applied to the U/D input. A "high" signal on the U/D input will cause the counter to increment its count, while a "low" signal will cause the counter to decrement its count.

As previously described, during the lockup period, the control logic operates the speed control logic so that data speed variations are detected and the speed count number is adjusted accordingly. In particular, during the lockup period, the control logic places a "high" signal on ISLD lead 402 (FIG. 8, line C) which signal enables counter 414 to begin counting when clock pulses appear on ICLK lead 400.

Next, the control logic places a "low" signal on the LOAD2 lead 408 (line D, FIG. 8). This signal is applied to the G enable input of six-bit latch 424 and causes the signal values on outputs Q2–Q64 of bit time counter 416 to be clocked into latch 424 thus preserving their values for the next bit time update cycle. The saving of the bit time values is necessary, as will be explained in detail below, to accomodate bit shift in the data and prevent it from interfering with the speed count correction.

The control logic then places a "low" signal on GLOAD1B lead 404 as shown in line E of FIG. 8 which signal causes the output of counter 414 to be loaded into counter 416. Counter 416 is a seven-bit binary counter which operates similar to counter 414 except that it only decrements its initial loaded value. In addition, when the counter reaches a count of zero, its count changes from normal binary notation to 2s-complement notation and its count begins to increase. Effectively, the count becomes negative (under normal circuit operation the positive count in counter 416 never exceeds approximately 48, therefore, the high order output Q64 corresponds to the sign of the output number—it is "0" if the number is positive and "1" if the number is negative).

Subsequently, the "low" signal on the GLOAD1B lead is removed and, as shown in line F of FIG. 8, the control logic places a "high" signal on CCEN lead 406 which "high" signal enables counter 416 to begin counting in response to clock pulses appearing on 48CLK lead 419. Counter 416 thereupon decrements its count once in response to each clock pulse until the "high" signal on the CCEN lead 406 is removed by the control logic. As shown in line F of FIG. 8, this signal is removed shortly after a data transition is detected by the control logic (the delay is due to the transition detection circuitry). Since counter 416 began counting shortly after a transition, and stops counting on the next succeeding transition, the count remaining in the counter at the time it is stopped will be indicative of whether the transition occurred either at the predicted time, before the predicted time or subsequent to the predicted time. In particular, if the count in 416 is "0" this is indicative that the data transition occurred at the predicted time. Similarly, if the count remaining in bit counter 416 is positive this indicates that the data transition occurred prior to the expected time. Likewise, a negative number in counter 416 indicates that the data transition occurred later than expected.

However, because the data transition time can be severely affected by bit shift as well as speed variations caused by the magnetic tape transport, the count remaining in counter 416 cannot be directly used to adjust the starting number in speed counter 414. Instead, in accordance with one aspect of the invention, a running average of the remainder in bit time counter 416 and the remainder from the preceding bit time is used to adjust the number in the initial speed counter 414.

More particularly, the output of counter 416 is divided by two and summed with one half of the remainder from the previous bit time stored in latch 424 to generate the running average. The division by 2 of the output of counter 416 is accomplished by wiring the output of counter 416 to input of a digital adder 430 so that the binary output number is shifted one place towards its least significant position thereby accomplishing a division by two. A similar connection is used between counter 416 and latch 424 so that the the stored value is one-half the counter output.

Adder 430 is a conventional six bit binary adder which may contain look-ahead circuitry to speed its operation. It produces a six-bit output signal which is the sum of the output signals from counter 416 and latch 424 including a sign bit. The outputs of adder 430 are decoded by OR gate 432 which produces a signal on the NRZ lead 434 which is connected to the control logic. The NRZ signal (line G in FIG. 8) indicates whether the phase-locked loop is synchronized to the data. If it is, the outputs of adder 430 will be all "0"s, causing gate 432 to provide a "low" signal on lead 434. Alternatively, if the phase-locked loop is not synchronized, a "high" signal is produced on NRZ lead 434.

The "high" NRZ signal causes the control logic to generate an ICLK signal on lead 400 (as shown in line H of FIG. 8), in turn, clocking counter 414 to adjust the predicted bit time number appropriately. The direction in which counter 414 operates is determined by the signal from the sign bit 436 of adder 430. In particular, if the sign bit is positive, then counter 414 will decrement its count, thereby reducing the time that counter 416 takes to decrement its initial count to zero and, effectively, reducing the predicted time until the next data transition. On the other hand, if the sign output of adder 430 is negative, counter 414 will increment its count in response to the ICLK signal thereby increasing the predicted bit time. A zero output appearing on the output of adder 430 prevents the control logic from applying the ICLK signal to the clock input of speed counter 414 and thus counter 414 does not increment or decrement.

Shortly afterward as shown in line D of FIG. 8, the control logic places a "low" signal on the LOAD2 line causing the present count of the bit counter 416 to be loaded into latch 424. The entire cycle is then repeated to correct for speed variations during the next bit time. Operation continues in this manner throughout the lockup period and afterwards when data is being collected.

OPERATION OF THE GATE LOGIC

Figure 5:
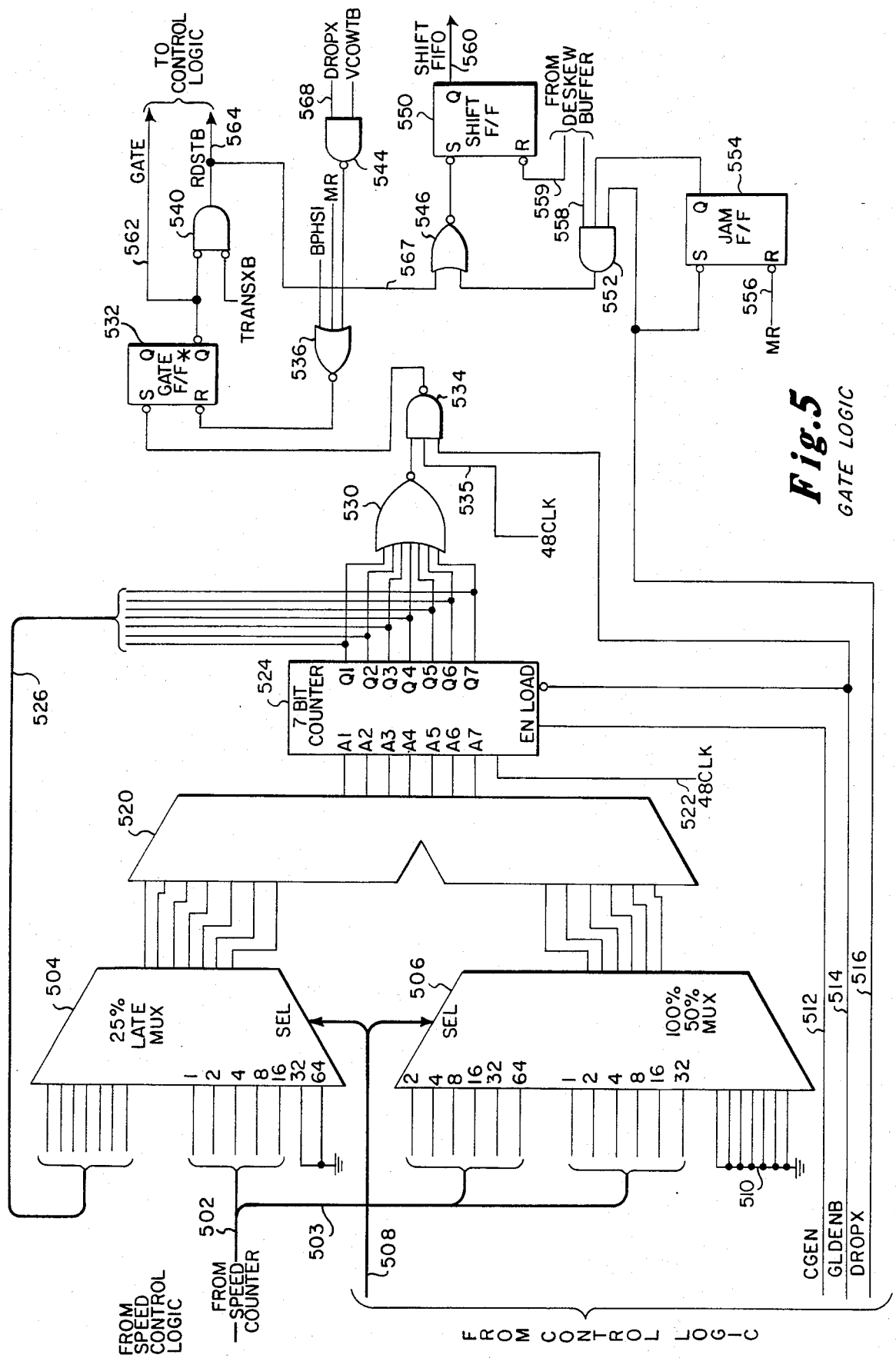
FIG. 5 is a block schematic diagram of the gate logic circuitry which generates the data transitions window and compensates for bit shift in the recorded data.

The output of the speed counter circuitry on bus 440 in FIG. 4 is provided to the gate logic shown in block diagram form in FIG. 5. The gate logic is used to generate a "gate" or "window" signal during which the incoming data stream is examined for data transitions. Any transition which is detected within the window (when the gate is "open") is assumed to be a data transition. Transitions which occur outside the window (when the gate is "closed") are assumed to be phase transitions. The gate opening or window start time is determined by a combination of factors including the predicted bit time number generated by the speed control logic and a compensation factor for bit shift which will be hereinafter described.

The binary number output from the speed control logic in FIG. 4 indicating the predicted time duration until the occurence of the next data transition is provided over bus 502 to multiplexers 504 and 506. Multiplexer 504 is a conventional 2-to-1 multiplexer which has two seven-bit inputs, either of which may be connected to its seven bit output under control of select signals appearing at its SEL input. Multiplexer 504 is controlled by select signals provided via bus 508 from the control logic as will be hereinafter described. The lower seven-bit input of multiplexer 504 receives the bit time prediction signals signals over bus 502 from the speed control circuitry. The upper seven-bit input is connected to the output of the gate counter 524 to provide bit shift compnesation as will be hereinafter described.

Multiplexer 506 is a conventional 3-to-1 multiplexer which can connect any one of its three seven-bit inputs to its seven-bit output under control of selection signals provided to its SEL input from the control logic over bus 508. The prediction number output generated by the speed counter circuitry is also provided, via bus 503, to two of the inputs on multiplexer 506. The remaining input of multiplexer 506 is connected to ground 510 so that all of its inputs receive a "low" signal.

The seven-bit outputs of multiplexers 504 and 506 are connected to the inputs of seven-bit adder 520. Adder 520 is a standard digital circuit element which algebraically sums the binary signals on its two inputs and provides the sum signal to the load inputs of seven-bit counter 524.

Counter 524 is a conventional seven-bit binary counter which may be loaded with a number placed on its A1–A7 inputs when a "low" signal is provided to its load input via GLDENB line 514 (FIG. 8, line I) . When a the signal provided to the load input is changed to a "high" signal, the counter is enabled to count. Counting actually starts when a "high" signal is provided to the counter's enable input, EN from the CGEN lead (as shown in FIG. 8, line J), and the initial number loaded into the counter is decremented under control of clock signals from clock signal source 48CLK on lead 422.

Under control of clock pulses the count decreases until it reaches zero. At this point the count begins to increase in a negative direction as indicated by the output becoming 2's complemented. The outputs Q1–Q7 of counter 524 are provided, via bus 526, to one input of multiplexer 504 and to the inputs of NOR gate 530 which detects when the count equals zero. Gate 530, when enabled, causes the data gate to open so that data transitions can be detected.

More particularly, if the outputs Q1–Q7 of counter 524 become all equal to zero, gate 530 applies a "high" signal to the upper input of AND gate 534. Gate 534 is a synchronizing gate which synchronizes the all zeroes signal with the clock pulse appearing on the 48CLK line 535 which is provided to the middle input of gate 534. The lower input of gate 534 is connected to the GLDENB signal line which, as previously described, is "high" when counter 524 is counting. Therefore, on the first clock pulse after counter 524 reaches a zero count, gate 534 will produce a low output setting gate flip/flop 532.

Set flip/flop 532 provides a "low" signal on its output Q* which is provided to the control logic as a GATE signal on lead 562. The "low" signal on lead 562 signifies the start of the gate period during which data transitions can be detected.

The data gate is closed at the end of the gate period when gate flip/flop 532 is reset by a "low" signal developed by NOR gate 536. Gate 536 produces a "low" signal output on the occurrence of any one of three conditions. In the normal case, gate flip/flop 532 is reset on a timing signal BPHS1 provided from the control logic shortly after a data transition has been detected. Flip/flop 532 can also be reset on the appearance of a reset signal (on lead MR) or during a data error (dropout) condition when gate 544 is enabled as will be hereinafter described.

In accordance with an aspect of the present invention, the gate counter circuitry is controlled by the control logic to automatically adjust the gate opening time and therefore the window width which separates data transitions from phase transitions under control of the selection signals provided from the control logic. In order to compensate for bit shifts in the incoming data, the window width is adjusted by changing the initial number (and therefore the starting count) loaded into gate counter 524 in response to the time relationship between the previous data transition and the predicted time of that transition.

In particular, multiplexer 504 can provide to adder 520 either the output generated by counter 524 or the prediction number generated by the speed control logic, as previously described. The prediction number, however is not connected directly to multiplexer 504 but is instead connected so that the number is effectively divided by four. In particular, the high-order bit of the prediction number (provided by the output Q64 of counter 416 in FIG. 4) is connected to the third highest order bit (magnitude 16) of multiplexer 504. In a similar fashion the second highest order bit of the prediction number (bit Q32 produced by counter 416) is connected to the fourth highest order bit (magnitude 8) of multiplexer 504. The two highest order bits of multiplexer 504 (16 and 32) are grounded. This connection effectively provides for a shift by two positions towards the least signficant bit of the binary prediction number produced by the speed control logic which is equivalent to dividing the number by four. Therefore, under control of selection signals produced by the control logic, multiplexer 504 can provide to the upper input of adder 520 a seven bit binary word which is the output of the gate counter 524 or 25% of the prediction number generated by the speed control circuitry.

In a similar fashion, the output of the speed control logic is provided, via bus 503, to two inputs of multiplexer 506 and connected so that at one multiplexer input the prediction output number is divided by two and at the other multiplexer input the is not divided at all. Multiplexer 506 can thus provide adder 520 with a number which is 100% of the prediction number, 50% of the prediction number or zero. The particular one of the three signal words which is selected by multiplexer 506 and provided to adder 520 is also controlled by the control logic by signals provided over bus 508.

As will hereinafter be described in detail, the control logic controls multiplexers 504 and 506 to select a predetermined set of input words depending on whether the previous data transition was detected at its predicted time, prior to its predicted time or after its predicted time.

In the case where the previous data transition was received at its predicted time, the control logic controls multiplexer 504 to provide to adder 520 with 25% of the prediction number. Multiplexer 506 is simultaneously controlled to provide to adder 520 with 50% of the prediction number. The outputs of multiplexers 504 and 506 are added by adder 520 and the resulting sum, equivalent to 75% of the prediction number, is loaded into counter 524.

Accordingly, counter 524 will pass through zero and cause the data gate to open as previously described at a time which is 75% of the predicted time for the arrival of the next data transition. Therefore, the gate opening will occur at a time which is 25% of the predicted time earlier than the data transition is expected. This window width allows the system to detect the data transitions even if there is some jitter or noise in the system and to allow the system to accomodate some minor bit shifting.

However, assuming the previous data transition was detected at a time after its predicted time, the control logic controls multiplexer 504 to provide the output of counter 524 to one input of adder 520. Multiplexer 506 is controlled to provide 100% of the prediction number to the other input of adder 520. The resulting sum is equal to 75% of the predicted time less the amount of time that the previous transition occurred after its predicted time. Thus, the data gate opening time will effectively be the same as if the previous transition had been on time. More particularly, if the previous data transition was late, the gate counter 524 will count through zero and begin counting negative. Since the transition occurred after the predicted time this negative count will be equal to 25% of the predicted time plus the amount of time that the transition occurred after its predicted time (25% arises from the fact that the normal gate opening time is 75% of the predicted bit time). However, as previously described, this negative count appears as a 2's complement number and when applied to adder 520 via multiplexer 504 effectively substracts from the 100% value applied by multliplexer 506 resulting in a number which is 75% of the predicted bit time minus the amount that the previous transition was late.

If the previous data transition arrived prior to its predicted time it is treated as if it arrived at its predicted time—multiplexers 504 and 506 are controlled so that the resultant sum produced at the output of adder 520 is 75% of the predicted time.

There is one final special case. Since phase transitions occur at regular intervals and are not as likely to be affected by bit shifts, the illustrative reading circuitry automatically synchronizes on phase shifts. In particular, in accordance with another aspect of the invention, if the control logic detects a transition when the data gate is not open, it forces an immediate loading of the gate counter with a count of 25% of the predicted number. Since the phase transitions normally occur in the center of a bit cell, a count of 25% of the predicted number will ensure that the gate opens at a time equal to 75% of the predicted time.

As previously mentioned, the gate signal is used to separate data transitions from phase transitions. In particular, the "low" GATE signal produced by gate flip/flop 532 enables gate 540. On the next transition which is detected by circuitry in the control logic (discussed in detail below) the signal on lead TRANSX* becomes "low" causing gate 540 to apply a "high" signal to the RDSTB (read strobe) lead 564, which signal is provided to the control logic to indicate that data is being shifted to the deskew buffer and to cause the control logic to reset the speed control logic and the gate logic for another bit period. The "high" signal on the lead 564 is also provided, via lead 567, to the upper input of NOR gate 546 which, in response thereto, produces a "low" signal, in turn, setting shift flip/flop 550.

Set flip/flop 550 provides a "high" signal on its Q output which is forwarded over lead 560 to the deskew buffer circuitry causing the deskew buffer to shift in one data transition. Flip/flop 550 acts in a handshaking arrangement with the deskew buffer circuitry so that after the circuitry has completed its shifting operation, a "low" signal is returned from the deskew buffer circuitry on lead 559 which resets flip/flop 550 indicating that one data transition has been shifted in.

OPERATION OF THE CONTROL LOGIC

Figure 6:
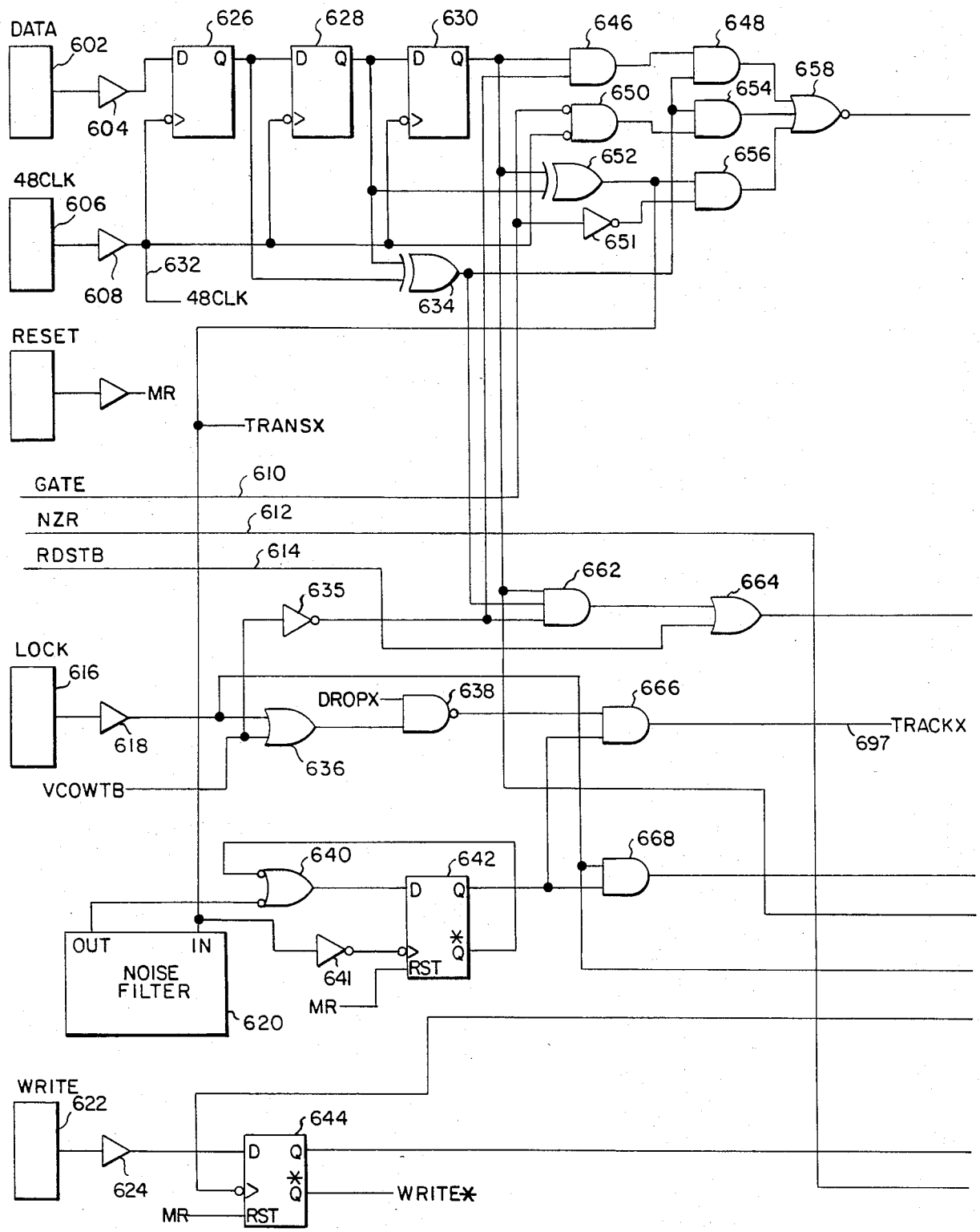
FIGS. 6 and 7 are schematic diagrams of the control circuitry which synchronizes and controls operations of the circuits shown in FIGS. 4 and 5.
Figure 6:
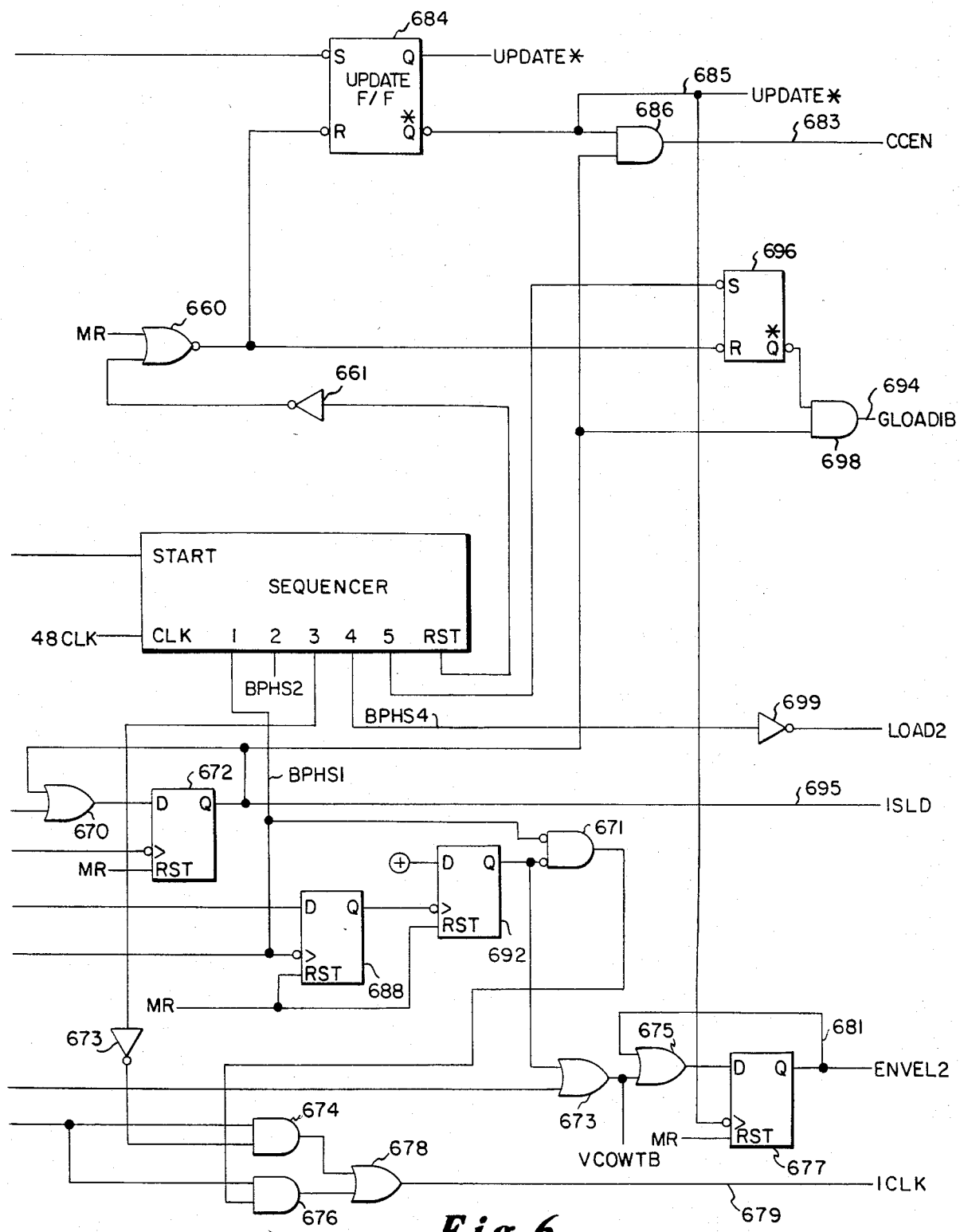
Figure 7:
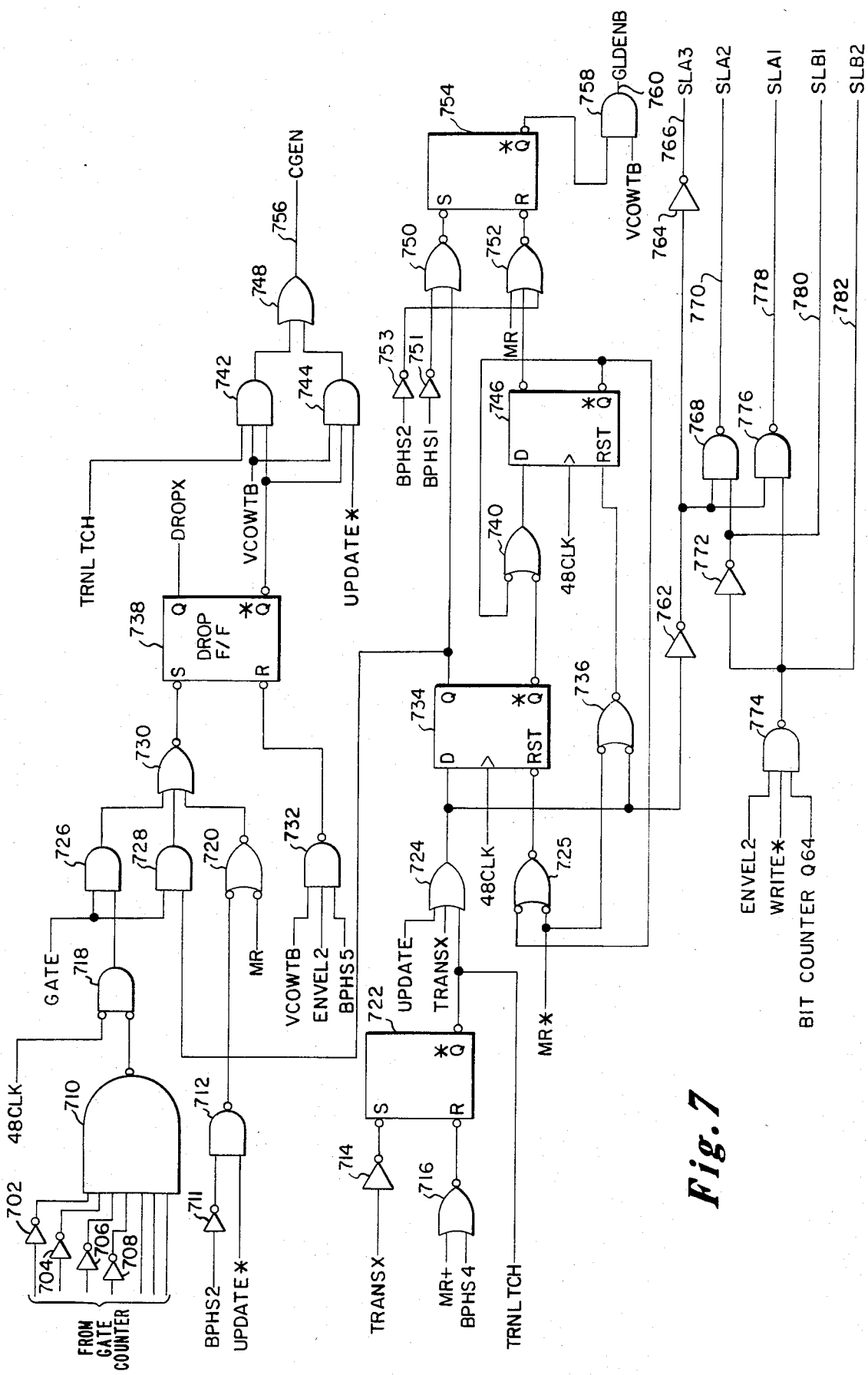

The control logic which receives the input signals from the external control logic and generates the timing and control signals to control the speed control and gate logic is shown in FIGS. 6 and 7.

Transition Detector

Data from the read amplifiers and pulse-shaping circuitry enters the control circuitry via terminal 602, passes through buffer gate 604, and is applied to the D-input of flip/flop 626, which is a conventional negative-edge-triggered D-type flip/flop. Flip/flops 626, 628 and 630 in conjunction with Exclusive-OR gates 634 and 652 constitute transition detection circuitry which is utilized to detect both phase and data transitions. The three flip/flops 626–630 are all clocked by a clock signal produced at the output of buffer gate 608. Buffer gate 608, in turn, receives the 48CLK signal from the external circuitry via terminal 606 and its output is provided to the transition detection circuitry and to other portions of the circuitry via lead 632. The output of flip/flop 626 are connected to the D-input of flip/flop 628. Similarly, the output of flip/flop 628 is connected to the D-input of flip/flop 630. Therefore, the signal present at the D-input of flip/flop 626 progresses along the chain of flip/flops in response to clock pulses applied to their clock inputs. The two inputs of exclusive OR gate 634 are connected to the output of flip/flop 626 and the output of flip/flop 628, respectively. Therefore, if these outputs are not the same, indicating a change, or transition, in the signal level, gate 634 will produce a "high" output. Similarly, the inputs of gate 652 are connected to the output of flip/flop 628 and the output of flip/flop 630, respectively, and gate 652 will generate a "high" output when a transition occurs one clock pulse later than Exclusive-OR gate 634.

The transitions detected by flip/flops 626–630 are used to control the operation of the remaining control circuitry which in turn controls the operation of the speed control logic and the gate logic. In particular, there are two distinct modes of operation of the control logic: lockup operation and data acquisition operation.

Lockup Operation

As previously mentioned, external control circuitry detects the beginning of a data record and asserts the LOCK signal. At this point, the incoming data is preamble data consisting of consecutive binary "0". As will be hereinafter explained, the control circuitry controls the speed control logic so that its phase-locked loop locks onto the basic data rate.

In particular, the output of transition detecting Exclusive-OR gate 652 is provided to the input of noise filter 620. Noise filter 620 is a conventional divide-by-four counter which simply counts four transitions before providing a "low" signal on its output. It provides some immunity against noise. The "low" signal produced at the output of noise filter 620 causes gate 640 to apply a "high" signal to the D-input of flip/flop 642. The rising edge of the next transition is inverted to produce a falling edge by inverter 641 that clocks flip/flop 642 which thereupon applies a "high" signal to its output Q. The output Q* of flip/flop 642 is applied back to the upper input of gate 640 and maintains a "high" signal at the D-input of flip/flop 642 so that flip/flop 642 remains set with its Q output "high" until it is reset by a signal from the master reset lead, MR.

The "high" output of flip/flop 642 is applied to the lower inputs of NAND gates 666 and 668. The upper input of NAND gate 666 receives a signal form the output of NAND gate 638 which signal, as will be hereinafter described, is "high" for conditions where no data errors have been detected. Therefore, NAND gate 666 produces a "high" signal on its output which is provided, via the TRACKX lead 697 to the external circuitry to indicate that transitions have been detected on the associated data track.

As previously mentioned, during the lockup period, the external circuitry asserts the LOCK signal which appears as a "high" signal on input terminal 616 and is provided by buffer 618 to the upper input of AND gate 668. AND gate 668 thereupon applies a "high" signal via OR gate 670 to the D-input of flip/flop 672.

Flip/flop 672 controls the initial loading of bit counter 416 in the speed control logic (shown in FIG. 4) and the gate counter 524 in the gate control logic (shown in FIG. 5). In particular, prior to the detection of transitions, flip/flop 672 is reset by a "high" signal appearing on the master reset lead, MR, and thus a "low" signal appears at its Q output. This "low" signal is applied, via lead 695, to the ISLD input of the speed control logic which causes the speed counter therein to load an initial predetermined starting count as previously described. This count provides an initial predicted arrival time of the next data transition. In addition, the "low" signal at the output of flip/flop 672 is applied to the lower input of AND gate 698 which causes it to apply a "low" signal to the GLOAD lead 694. This "low" signal is, in turn, applied to the load input of the data counter 524 causing it to load a starting count. As will be hereinafter described, selection signals are produced by the control circuitry so that multiplexers 504 and 506 in FIG. 5 are controlled to load 75% of the initial starting number loaded into the speed counter 414 into the gate counter.

After the initial values of the counters have been loaded the circuitry is ready to start the phase-locked loop in the speed control circuitry in operation to lock to the data rate. The gate counter circuitry is disabled at this time. More specifically, flip/flop 672 is clocked by a falling edge on the output Q of flip/flop 630. Since lockup occurs while data is being read from the preamble of the record (consecutive "0"s) a negative transition occurs on a data transition. Set flip/flop 672 produces a "high" signal at its output Q which is applied to the upper input of OR gate 670 which, thereupon, applies a "high" signal to the D-input of flip/flop 672. Flip/flop 672 therefore remains set until it is reset by a signal on the MR reset lead.

A "high" signal at the Q output of flip/flop 672 is applied, via ISLD lead 695, to the load input of the bit counter in the speed control circuitry thereby enabling it to count. In addition, the "high" signal produced by flip/flop 672 is applied to the lower input of AND gate 698. AND gate 698 receives a "high" signal from the Q* output of flip/flop 696 (which is reset at this time) and therefore applies a "high" signal via GLOAD1B lead 694 to the load input of the gate counter which will enable it to begin counting at a later time. In addition, the "high" signal at the output of flip/flop 672 is applied to the lower input of AND gate 686. The upper input of AND gate 686 receives a "high" output from the Q* output of update flip/flop 684 (which is reset at this time). Gate 686 thereupon produces a "high" signal at its output which is applied, via lead 683, to the CCEN lead and enables the bit counter in the speed control logic to begin counting.

The bit counter counts until a data transition is received at which point the control logic initiates an update sequence by setting the update flip/flop 684. During the update sequence the count remaining in the bit counter is used to determine whether the data transition arrived before, at or after the predicted arrival time corresponding to the number initially loaded into counter 414. In particular, during the lockup period, gates 646 and 648 detect an incoming data transition. As previously explained, a data transition occurs when the signal level changes from a "high" to "low". A "high" signal level present at the output Q of flip/flop 630 enables gate 646 by means of its upper input. The lower input of gate 646 receives a "high" signal from the output of inverter 635 which, during the lockup period, produces a "high" signal due to a "low" signal on the VCOWTB lead as will hereinafter be explained.

Gate 646 thereby enables gate 648 by providing a "high" signal to its upper input when the present signal level is "high". The lower input of gate 648 also receives a "high" signal from Exclusive-OR gate 634 when that gate detects a transition as previously described. Thus, gate 648 produces a "high" output upon the occurrence of a "high" to "low" transition. This high output is provided to NOR gate 658 which, in turn, provides a "low" signal to the set input of update flip/flop 684.

Flip/flop 684 thereupon becomes set and places a low signal on its Q* output which "low" signal disables gate 686. Disabled gate 686 places a "low" signal on its output lead 683 which is, in turn, applied to the CCEN lead which stops the bit counter from counting as previously described.

After the bit counter has been stopped, the control circuitry then corrects the predicted bit time by adjusting the initial count in speed counter 414. In particular, as previously described, if the detected data transition does not arrive at the predicted time the speed control circuitry will produce a "high" signal on the NZR lead which "high" signal is provided to the control logic, via lead 612, and is applied to gates 674 and 676 to enable them.

The adjustment of the initial count in the speed counter is controlled by sequencer 682 and update flip/flop 684. Sequencer 682 is a conventional sequencing circuit which when a "high" signal is applied to its START input, generates a series of negative-going timing pulses sequentially on its outputs 1-5, RST under control of clock pulses applied to its clock input. The clock input of sequencer 682 is tied to the master clock lead 48CLK and thus in response to a clock pulse a timing pulse appears at output 1. In response to the next clock pulse a timing pulse appears at output 2. Operation continues in this fashion until a timing pulse appears at output RST in response to the sixth clock pulse after a "high" signal is provided to the START input. The leading or falling edge of these clock pulses is used to trigger various events in the circuitry.

Sequencer 682 is, in turn, controlled by OR gate 664 and AND gate 662. The upper input of AND gate 662 is connected to the Q output of flip/flop 630. The middle input of AND gate 622 is connected to the output of Exclusive-OR gate 634. As previously mentioned, gate 634 produces a "high" output when a transition is detected. Therefore gate 662 will be enabled when the present data level is "high" and a transition from "high" to "low" occurs. Since at this time the system is still reading consecutive "0"s in the preamble, gate 662 will be enabled on a data transition. As previoulsy mentioned, during the lockup period, a "low" signal appears on the VCOWTB lead and thus the lower input of gate 662 is held "high" by invertor 635. Gate 662 therefore applies a "high" signal to the upper input of OR gate 664 which, in turn, applies a "high" signal to the START input of sequencer 682.

When sequencer 682 is started, the first clock pulse generated by it appears on lead BPHS1 which clock pulse is applied to the upper input of gate 671 to enable it. During the lockup period flip/flop 692 is reset so that a "low" signal at its Q output is provided to the lower input of gate 671.

Enabled gate 671 thereupon applies a "high" signal to AND gate 676. As discussed above, AND gate was enabled by a "high" signal on the NRZ lead from the speed control circuitry and thus it applies a "high" signal to OR gate 678 to enable it. OR gate 678 thereupon applies a "high" signal, via lead 679, to the ICLK input of the speed control logic which clocks the speed count to adjust the prediction number as previously described.

In accordance with an aspect of the invention, the initial prediction number in the speed counter is only changed by a predetermined, fixed amount each update cycle no matter how early or late the data transition was compared to its predicted time. This limitation in the amount of change prevents the speed control circuitry from overcompensating the predicted bit times if the data transition was early or late due to bit shift rather than tape transport speed variations. The actual amount of adjustment allowed per update cycle varies depending on whether the system is operating in the lockup cycle or in the data acquisition cycle. More particularly, the number of clock pulses provided to speed counter 414 per update cycle is two when the system is operating in the lockup mode, but only one when the system is operating in the data acquisition mode. Since there are approximately 48 clock pulses per bit time during the lockup mode, the two clock pulses applied to the counter increase or decrease the initial value in the counter to correct for speed errors at a rate of approximately 4% per bit time. This rate allows the phase-locked loop to more quickly lock onto the appropriate frequency. During the data acquisition mode, the sinlge clock pulse per update cycle limits the change rate to approximately 2% per bit time.

Sequencer 682 then produces a timing pulse on its output 2, on lead BPHS2. This signal is used to control the gate counter as will hereinafter be described. Subsequently, on the next 48CLK clock pulse, sequencer 682 produces a timing pulse on its output 3 which timing pulse is inverted by invertor 673 and applied as a "high"

signal to enable gate 674. Enabled gate 674 produces a "high" signal which is forwarded by OR gate 678 and lead 679 to the ICLK input updating the bit counter a second time during the lockup period.

Sequencer 682 subsequently applies a "low" timing signal to its output 4. This "low" signal is inverted by invertor 699 and applied as a "high" signal to the LOAD2 input of the speed control circuitry causing six-bit latch 424 to store the previous bit count in order to perform the running average in accordance with the inventive principles disclosed above.

Subsequently, sequencer 682 places a "low" signal on its output 5. This "low" signal sets flip/flop 696 which, in turn, provides a "low" signal on its Q* output which "low" signal disables gate 698 which, in turn, applies a "low" signal, via lead 694, to the GLOAD1B lead. The "low" GLOAD1B signal, as previously described, causes the new predicted value to be loaded into the bit time counter on the speed control logic.

Finally, sequencer 682 removes the "low" pulse from its output number 5 and places a "low" timing pulse on its reset output RST. This "low" pulse is inverted by inverter 661 and applied as a "high" signal to the lower input of NOR gate 660. NOR gate 660, in turn, applies a "low" signal to the reset input of update flip/flop 684, resetting the flip/flop and ending the update cycle. The low output of NOR gate 660 is also applied to the reset input of flip/flop 696 resetting it and removing the "low" GLOAD1B signal to the bit counter.

Reset flip/flop 684, in turn, enables gate 686 to apply a "high" signal to its output lead 683 which "high" signal, in turn, enables the bit counter (over the CCEN line) and a new cycle of counting begins.

Data acquisition operation

Operation during the lockup period continues as described above until the external circuitry removes the LOCK signal after a predetermined number of bit times. As previously mentioned, the removal of the LOCK signal indicates that the reading circuitry is to begin examining the incoming data stream for data transitions. Since the data transitions can occur in either direction indicating digital "1"s or "0"s the gate logic must be used to separate data transitions from phase transitions as will be hereinafter described.

The data acquisition period starts when flip/flop 688, in conjunction with flip/flop 692, detects the end of the lockup period. In particular, during each update cycle, the falling edge of the clock pulse on the BPHS1 lead of sequencer 682 clocks flip/flop 688. During the lockup period, the D input of flip/flop 688 is held "high" by the LOCK signal on terminal 616 and buffer 618. Thus, a "1" is clocked into flip/flop 688 and appears on its output Q. The output Q of flip/flop 688 is connected to the clock input of flip/flop 692. However, since the signal at the output of flip/flop 688 changes from a "0" to a "1" it does not clock flip/flop 692 which requires a "1"-to-"0" transition to clock it.

However, at the end of the lockup period, the external circuitry places a "low" signal on the LOCK terminal 616 which "low" signal is forwarded by buffer 618 to the D input of flip/flop 688. On the next update cycle flip/flop 688 is again clocked by sequencer 682 so that the "low" signal provided from the LOCK terminal 616 is clocked into the flip/flop causing its output to go from "high" to "low". This "high"-to-"low" change clocks flip/flop 692 which causes its Q output to produce a "high" signal since its D-input is permanently connected to positive voltage.

A "high" signal at the output of flip/flop 692 disables gate 671 and prevents the first update of the predicted bit time counter from occurring. In addition, the "high" signal at the output of flip/flop 692 is applied, via OR gate 673, to the VCOWTB lead. A "high" signal on this lead indicates that the lockup period is over and that the data acquisition has begun. The "high" signal at the output of gate 673 is also provided, via OR gate 675, to the D input of flip/flop 677 to enable it. This flip/flop controls the selection circuitry which selects the signals to be provided to the gate counter circuitry during the data acquistion period and will be set during the next update.

The "high" signal appearing at the VCOWTB lead switches the control logic from a synchronizing mode to a data acquisition mode. In particular, the signal on the VCOWTB lead is applied to OR gate 636 which, in turn, applies a "high" signal to NAND gate 638 enabling it.

The signal on the VCOWTB is also inverted by invertor 635 and disables AND gates 646 and 662 preventing them from responding erroneously to transitions which may not be data transitions since the reading circuitry will be reading data which is not all "0"s as in the preamble.

In addition, the "high" signal on the VCOWTB lead is applied to gates 742, 744 and 758 shown in FIG. 7 to allow these gates to generate the timing signals used to operate the gate logic. During the data acquisition period operation of the speed control circuitry continues as previously described except that only one clock pulse is provided to the speed counter during each update cycle because gate 676 is now disabled by gate 671.

However, during each update cycle the gate logic is also updated to compensate for bit shifts. In particular, loading of the gate counter is controlled by sequencer 682 in conjunction with NOR gates 750 and 752 and flip/flop 754. Specifically, a "low" timing signal produced by sequencer 682 on lead BPHS1 is inverted by inverter 751 and applied as a "high" signal to NOR gate 750. In response, NOR gate 750 applies a "low" signal to the set flip/flop of 754, in turn, setting the flip/flop. Set flip/flop 754 applies a "low" signal to its Q* output which, in turn, disables gate 758 causing it to apply a "low" signal on its output lead 760. This low signal is applied to the GLDENB lead which causes a selected percentage of the prediction number to be loaded into the gate counter as described in connection with the gate logic.

Subsequently, sequencer 682 places a "low" signal on its timing lead BPHS2 which is inverted by inverter 753 and applied as a "high" signal to NOR gate 752. NOR gate 752, in turn, applies a "low" signal to the reset input of flip/flop 754, resetting the flip/flop, and, thereby, causing gate 758 to apply a "high" signal to its output lead 760. This "high" signal, in turn, removes the loading signal and enables the gate counter to begin counting.

Counting of the gate counter is controlled by gates 742, 744 and 748. As previously mentioned, at the end of the lockup period gates 742 and 744 were enabled by a "high" signal appearing on the VCOWTB lead. In addition, both gates are provided with a "high" signal from the output of reset flip/flop 738 under conditions where no data errors or "dropouts" have occurred. Gate 742 is enabled by a "high" signal appearing on the TRNLTCH lead. This signal is generated from flip/flop 722 when a transition is detected by the transition detecting logic.

Gate 744 is enabled by a "high" signal appearing on UPDATE* lead, which signal is "high" when the circuitry is not in the update mode. The output of gates 742 and 744 is combined by OR gate 748 and applied to the CGEN lead 756 therefore the gate counter is enabled to count if the system is not in the update mode or if the system is in the update mode but transition has been detected.

As previously mentioned, when the gate counter circuitry begins operating the gate signal becomes "low" to open the gate after an amount of time which is set by the relationship of the previous data transition to its predicted time. The low signal on the gate lead is used by the control logic to detect incoming data transitions.

More particularly, the "low" signal on the GATE lead is applied, via lead 610, to gate 650 and invertor 651. Gate 650 is fully enabled by a "low" signal appearing on the 48CLK clock lead and applies a "high" signal to gate 654 to enable it. Invertor 651, in response to the "low" signal applies a "high" signal to gate 656 to enable it. Gates 654 and 656 are connected to the outputs of NOR gates 634 and 652, respectively. Thus, these gates detect a transition occurring during the period when the gate is open which transition is interpreted by the control logic as a data transition. Both gates 654 and 656 are necessary to avoid a gate delay problem which might otherwise cause a transition to be missed.

The detection of the data transition by either of gates 654 or 656 results in that gate applying a "high" signal to NOR gate 658 which in turn sets update flip/flop 684 initiating another update cycle. As discussed above, the update sequence is controlled by sequencer 682. However, sequencer 682 is no longer started by AND gate 662 but is instead started by a "high" signal appearing on the RDSTB lead 614. As previously mentioned, this signal is generated when a data transition is detected and the gate is open. A "high" signal on the RDSTB lead is applied, via OR gate 664, to the START input of sequencer 682 to start the update sequence which will cause the new predicted number to be loaded into the bit counter and the gate counter as previously described.

Gate counter selection circuitry

The circuitry which controls the gate logic multiplexers that determine the input to the gate counter circuitry consists of gates 724 and 774 and their associated circuitry. As previously mentioned, the starting count provided to the gate counter is adjusted in accordance with the time relationship between the previous data transition to its predicted arrival time. Gate 774 determines whether the previous data transition has arrived early, late or on time. Gate 724 is enabled when a phase transition is detected prior to a data transition and causes an immediate update of the gate counter.

In particular, gate 774 is enabled if the previous transition is late and disabled if the previous transition is early or ontime (the early and ontime transitions are treated in the same manner). The upper input of gate 774 is provided with the ENVEL2 signal generated by flip/flop 681 (FIG. 6). As previously described this flip/flop receives a "high" signal at its D input when the LOCK signal is removed by the external control circuitry at the end of the lockup period. This "high" signal is clocked into flip/flop 681 by the UPDATE* signal produced by the update flip/flop 684 during the first update cycle following the removal of the LOCK signal and the ENVEL2 signal thereupon becomes "high", in turn, enabling gate 774. If the control logic is not in the WRITE mode (described below) the middle input of NAND gate 774 is provided with a "high" signal from the WRITE* lead.

The lower input of gate 774 is connected to the Q64 output of the bit counter 416 shown in FIG. 4. This is, as previously mentioned, effectively the sign bit. If the previous data transition was late, the count in the bit counter will be negative and this bit will be "high" because of the 2's complement action of the counter. Therefore, gate 774 will be enabled. If, on the otherhand, the transition was early or on time bit Q64 will be "low" disabling gate 774.

Therefore, if the previous transition was late, gate 774 will apply a "low" signal to its output lead disabling gate 776 and enabling gate 768 by means of inverter 772. Enabled gate 768 applies a "high" signal to its output lead 770 which high signal is applied to the selection lead SLA2. Disabled gate 776 in turn produces a "low" signal on its output lead 778 which is applied to the selection lead SLA1. The "high" signal at the output of invertor 762 is inverted by inverter 764 and applied as a "low" signal to lead 766 which is the selection signal SLA3. The "low" signal at the output of gate 774 appears on lead 782 as the selection signal SLB2. Finally, the "high" signal at the output of invertor 772 appears as a "high" signal on lead 780 as selection signal SLB1. Selection signals SLA1-3 are provided to multiplexer 506 to select the inputs to the gate counter as previously described. Selection signals SLB1-1 are applied to multiplexer 504 to select the inputs to the gate counter as previously described.

If, on the otherhand, the previous pulse arrived either early or on time with respect to its predicted time, gate 774 will instead produce a "high" output signal because the sign bit Q64 of the bit counter will be "low". These signals are decoded by the gate so that selection signal SLA1 is high while the selection SLA2 and SLA3 are "low" and the selection signal SLB1 is "low" while selection signal SLB2 is "high".

A special case arises when a transition is detected when the gate is closed. As previously mentioned this transition is interpreted as a phase transition and the gate counter is loaded with a count equal to 25% of the prediction count.

Specifically, the circuitry which detects phase transitions and loads the counter consists of gate 724 and flip/flops 734 and 746 and related circuitry. When a transition is detected the transition detector circuitry, lead TRANSX becomes "high" as previously mentioned. This "high" signal is applied to inverter 714 which sets flip/flop 722. Flip/flop 722 is reset during a later update cycle by a timing pulse on output 4 of the sequencer 682 on lead BPHS4 (or a signal on the master reset lead MR).

Set flip/flop 722 applies a "low" signal to NOR gate 724 from its Q* output. On the next clock pulse on the 48CLK line the signal TRANSX will become "low" as the transition passes out of the transition detector, thus two inputs to gate 724 will be "low". If the transition occurred outside of the gate interval the UPDATE lead will also provide a "low" signal to the upper input of gate 724 (if the transition occurred when the gate was open either of gates 654 or 656 would set the update flip/flop as described above to produce a "high" signal on the UPDATE lead).

Therefore, if a phase transition is detected, all three inputs to gate 724 are "low" causing gate 724 to apply a "high" signal to the D input of flip/flop 734. The "high" signal generated by gate 724 is also applied to gate 736 causing it to remove the "low" signal from its output and allow flip/flop 746 to be "set". On the next falling edge of the clock signal on line 48CLK, flip/flop 734 is "set" applying a "high" signal to NOR gate 750 which sets flip/flop 754. Set flip/flop 754 causes to gate counter to be loaded as previously described.

Set flip/flop 734 also applies a "low" signal from its Q* output to gate 740 which, in turn, applies a "high" signal to the D input of flip/flop 746. Flip/flop 746 is thus "set" on the next falling edge of the clock signal on lead 48CLK and resets flip/flop 754 by means of NOR gate 752. When flip/flop 752 is reset it removes the load signal from the gate counter enabling it to begin counting.

Flip/flops 734 and 746 are connected so that the load signal produced by flip/flop 754 lasts for only one clock pulse. Specifically, the "low" Q* output of set flip/flop 746 is also applied to gate 725 causing it to apply a "low" signal to the reset input of flip/flop 734, resetting the flip/flop. Reset flip/flop 734, then applies a "low" signal from its Q output to the D input of flip/flop 746 so that flip/flop 746 is reset on the next clock pulse.

The following table illustrates the combination of selection signals produced in each case:

| Previous Trans. | S LA1 | S LA2 | S LA3 | S LB1 | S LB2 | Mux 504 | Mux 506 | Sum |
|---|---|---|---|---|---|---|---|---|
| On time | 1 | 0 | 0 | 0 | 1 | 25% | 50% | 75% |
| Early | 1 | 0 | 0 | 0 | 1 | 25% | 50% | 75% |
| Late | 0 | 1 | 0 | 1 | 0 | −(25%+L*) | 100% | 75%−L* |
| Phase | 0 | 0 | 1 | 0 | 1 | 25% | 0 | 25% |

L = the amount of time that the detected data transition occurs after the expected time.

Data Dropout Detection

In some cases, a data transition may be so delayed that it cannot be detected by the illustrative circuitry. In this case additional circuitry is used to indicate a data error or dropout. This circuitry consists of drop flip/flop 738 and the gate circuitry which sets and resets the flip/flop. A data error or drop condition can be caused by three conditions. One of these conditions is that the gate counter has exceeded 150% of its prediction count. Since the normal expected count of the gate counter is 75% of forty-eight counts or approximately thirty-six counts when the gate counter reaches a count of 72 (150% of its nominal count) a data dropout condition will be declared. The dropout count is detected by gate 710 and inverters 702–708. When the predetermined drop number is reached gate 710 produces a "low" signal on its output which enables gate 718. During the next "low" period of the clock signal on lead 48CLK, gate 718 applies a "high" signal to gate 726. Gate 726 is, in turn, enabled during the window condition when the GATE signal is "high". In response, gate 726 produces a "high" signal which is forwarded by NOR gate 730 as a "low" signal to set drop flip/flop 738.

The other conditions which produce a dropout condition are error conditions. Gate 728 detects a condition in which flip/flop 735 is "set" indicating that a data transition has been detected at the same time as the data gate was opening as indicated by the GATE signal going "high". Gate 720 is enabled when sequencer 682 has been started (indicated by a "high" signal on lead BPHS2 which is inverted by inverter 711) yet the update flip/flop has not been set indicating that no data transition has been detected. Either of these conditions causes the drop flip/flop 738 to be "set".

When flip/flop 738 is set it applies a "low" signal to its Q* output which in turn disables gates 742 and 744 removing the enable signal from the gate counter. A "high" signal on the DROPX lead is also applied by flip/flop 738 to gate 638 in FIG. 6 causing it to provided a "low" signal to NAND gate 666 which in turn places a "low" signal on the TRACKX lead indicating that an error condition has been encountered on the associated track.

One consequence of the appearance of the DROPX signal is that the gate is closed. In particular, as shown on FIG. 5 an inverted dropout signal, DROPX*, is provided to the upper input of gate 744. During a data dropout condition this signal will be "low" causing gate 544 to apply a "high" signal to NOR gate 536. NOR gate 536 will in turn apply a "low" signal to the reset input of gate flip/flop 532, resetting the flip/flop and terminating the gate window.

The DROPX signal is also used to fill the deskew buffer with zeroes. Specifically, the DROPX signal appearing on lead 516 will set the jam flip/flop 554 causing a "high" signal to appear at its Q output, in turn, enabling gate 552. The "high" DROPX signal is also applied to the lower input of gate 552 enabling it. After the deskew buffer has finished shifting in the previous data transition, a "high" signal is applied to lead 558 by the deskew buffer, which "high" signal causes gate 552 to apply a "high" signal to NOR gate 546. NOR gate 546, in turn, sets shift flip/flop 550 and causes it to remain set while gate 552 is enabled. Thus a "high" signal is provided on the SHIFT OUT lead which causes the deskew buffer to continuosly shift in new data. Other circuitry (not shown) forces the data output of the control circuitry to "0" so that all "0"'s are shifted into the deskew buffer, indicating a data error condition.

Read After Write Operation

As previously mentioned the illustrative circuitry can also perform a read after write operation so that the write circuitry can be checked for proper operation. During this check the phase-locked loop and gate counter circuitry are disabled. In order to perform this operation, the external control circuitry places a "high" signal on terminal 622 which signal is buffered by gate 624 and applied to the D input of flip/flop 644. The clock input of flip/flop 644 receives a clock signal from the BPHS1 lead. Therefore flip/flop 644 will be set shortly after the first data transition is detecting following the assertion of the WRITE signal.

Set flip/flop 644 applies a "high" signal to OR gate 673 effectively terminating the lockup period so that the phase-locked loop cannot synchronize to the data. In addition, set flip/flop 644 applies a "low" signal from its Q* output to gate 774 disabling it and permanently setting the percentage of the predicted bit time which is provided as an input to the gate counter to 75%. The gate counter therefore does not compensate for bit shifts.

What is claimed is:

1. In apparatus for decoding phase encoded data having data transitions and phase transitions, said apparatus having means for detecting data transitions, phase-locked loop circuitry responsive to said data for producing signals indicative of the predicted time of detection of each of said data transitions, the improvement comprising;
   means responsive to said data transitions and to said indicating signals for adjusting the predicted time of detection of one of said data transition in response to a running average of the difference between the predicted detection time and the actual detection time for at least two previous data transitions, and
   means for limiting the amount of adjustment made by said adjusting means to a predetermined maximum change.

2. In apparatus for decoding phase encoded data, the improvement according to claim 1 wherein said predetermined maximum is larger when said decoding apparatus is attempting to synchronize to said data than when said apparatus is decoding data transitions.

3. In apparatus for decoding phase encoded data having data transitions and phase transitions, said apparatus having means for detecting data transitions, phase-locked loop circuitry responsive to said data for producing signals indicative of the predicted time of detection of each of said data transitions, and wherein said detection means comprises gate means responsive to said indicating signals for generating a signal defining a time interval during which data transitions can be detected, the improvement comprising,
   means responsive to said data transitions and to said indicating signals for adjusting the predicted time of detection of one of said data transition in response to a running average of the difference between the predicted detection time and the actual detection time for at least two previous data transitions, and
   means responisve to said indicating signals and to said data transitions for changing said interval sign to vary the duration of said time interval for detection of one of said data transitions depending on the occurrence in time of a previous one of said data transitions relative to its predicted detection time.

4. In apparatus for decoding phase encoded data, the improvement according to claim 3 wherein said interval signal changing means changes said interval signal to a first value when said previous data transition is detected prior to its predicted detection time, said interval signal changing means changes said interval signal to a second value when said previous data transition is detected at its predicted detection time and said interval signal changing means changes said interval signal to a third value when said previous data transition is detected after its predicted detection time.

5. In apparatus for decoding phase encoded data, the improvement according to claim 4 wherein said first and said second interval values are of equal time duration.

6. In apparatus for decoding phase encoded data, the improvement according to claim 5 wherein said first, said second, and said third values are proportional to the predicted arrival time for said next data transition.

7. In apparatus for decoding phase encoded data, the improvement according to claim 5 wherein said first value is a predetermined percentage of said predicted arrival time for said 'next data transition; said second value is a predetermined percentage of said predicted arrival time for said next data transition; and said third value is a predetermined percentage of said predicted arrival time for said next data transition less a fourth value which is proportional to the amount of time which said previous transition was detected after its predicted detection time.

8. In apparatus for decoding phase encoded data having data transitions and phase transitions, phase-locked loop circuitry responsive to said data for producing signals indicative of the predicted time of detection of each of said data transitions, gate means responsive to said indicating signals for generating a signal defining a time interval during which data transitions can be detected and means responsive to said indicating signals and said interval signals for detecting data transitions, the improvement comprising,
   means responsive to said indicating signals and to said data transitions for changing said interval signals to vary the duration of said time interval for detection of one of said data transitions depending on the occurrence in time of a previous one of said data transitions relative to its predicted detection time,
   means responsive to said data transitions and to said indicating signals for adjusting the predicted time of detection of one of said data transitional in response to a running average of the difference between the predicted time and the actual detection time for the two immediately previously data transitions, and
   means for limiting the amount of adjustment made by said adjusting means to a predetermined maximum change.

9. In apparatus for decoding phase encoded data, the improvement according to claim 8 wherein said predetermined maximum is larger when said decoding apparatus is attempting to synchronize to said data than when said apparatus is decoding data transitions.

10. In apparatus for decoding phase encoded data, the improvement according claim 8 wherein said interval signal changing means changes said interval signal to a first value when said previous data transition is detected prior to its predicted detection time, said interval signal changing means changes said interval signal to a second value when said previous data transition is detected at its predicted detection time and said interval signal changing means changes said interval signal to a third value when said previous data transition is detected after its predicted detection time.

11. In apparatus for decoding phase encoded data, the improvement according to claim 10 wherein said first and said second interval values are of equal time duration.

12. In apparatus for decoding phase encoded data, the improvement according to claim 11 wherein said first, said second, and said third values are proportional to the predicted arrival time for said next data transition.

13. In apparatus for decoding phase encoded data, the improvement according to claim 12 wherein said first value is a predetermined percentage of said predicted arrival time for said next data transition; said second value is a predetermined percentage of said predicted arrival time for said next data transition; and said third value is a predetermined percentage of said predicted arrival time for said next data transition less a fourth value which is proportional to the amount of time which said previous transition was detected after its predicted detection time.

14. In apparatus for decoding phase encoded data, the improvement according to claim 10 wherein said interval signal changing means changes said interval signal to a fifth value when a phase transition is detected.

15. Apparatus for decoding phase encoded data having data transitions and phase transitions comprising
means for detecting data transitions,
a first counter for generating speed count signals indicative of the predicted time of detection of a data transition, said speed count signals starting at a programmable speed start count
means responsive to said data for starting said counter upon the detection of a data transition, and
means responsive to said data transitions and to said speed count signals for adjusting said speed start count in response to a running average of the difference between the predicted detection time and the actual detection time for at least two previous data transitions.

16. Apparatus for decoding phase encoded data according to claim 15 wherein said running average is the running average of the difference between the predicted detection time and the actual detection time for the two immediately previous data transitions.

17. Apparatus for decoding phase encoded data according to claim 15 further comprising means for changing said speed start count by a predetermined number if the running average of the difference between the predicted detection time and the actual detection time for the two immediately previous data transitions is non-zero.

18. Apparatus for decoding phase encoded data according to claim 17 wherein said predetermined number is larger when said decoding apparatus is attempting to synchronize to said data than when said apparatus is decoding data transitions.

19. Apparatus for decoding phase encoded data according to claim 15 wherein said detection means comprises
a second counter for generating gate count signals defining a time interval during which data transitions can be detected, said gate count signals starting at a programmable gate start count
means responsive to said speed count signals and to said data transitions for changing said gate start count to vary the duration of said time interval for detection of one of said data transitions depending on the occurrence in time of a previous one of said data transitions relative to its predicted detection time.

20. Apparatus for decoding phase encoded data according to claim 19 wherein said gate start count changing means changes said gate start count to a first value when said previous data transition is detected prior to its predicted detection time, said gate start count changing means changes said gate start count to a second value when said previous data transition is detected at its predicted detection time and said gate start count changing means changes said gate start count to a third value when said previous data transition is detected after its predicted detection time.

21. Apparatus for decoding phase encoded data according to claim 20 wherein said first and said second gate start count values are equal.

22. Apparatus for decoding phase encoded data according to claim 21 wherein said first, said second, and said third gate start count values are proportional to the speed start count.

23. Apparatus for decoding phase encoded data according to claim 22 wherein said first gate start count value is a first predetermined percentage of said speed start count; said second gate start count value is a second predetermined percentage of said speed start count; and said third gate start count value is a third predetermined percentage of said speed start count less a fourth value which is proportional to the amount of time which said previous transition was detected after its predicted detection time.

24. Apparatus for decoding phase encoded data according to claim 23 wherein said first predetermined percentage is 75%, said second predetermined percentage is 75% and said fourth predetermined percentage is 75%.

25. Apparatus for decoding phase encoded data according to claim 24 wherein said gate start count changing means changes said gate start count signal to a value equal to 25% of said speed start count when a phase transition is detected.

26. Apparatus for decoding phase encoded data having data transitions and phase transitions comprising
means for detecting data transitions,
phase-locked loop circuitry responsive to said data for producing signals indicative of the predicted time of detection of each of said data transitions
a counter for generating gate count signals defining a time interval during which data transitions can be detected, said gate count signals starting at a programmable gate start count
means responsive to said indicating signals and to said data transitions for changing said gate start count to vary the duration of said time interval for detection of one of said data transitions depending on the occurrence in time of a previous one of said data transitions relative to its predicted detection time.

27. Apparatus for decoding phase encoded data according to claim 26 wherein said gate start count changing means changes said gate start count to a first value when said previous data transition is detected prior to its predicted detection time, said gate start count changing means changes said gate start count to a second value when said previous data transition is detected at its predicted detection time and said gate start count changing means changes said gate start count to a third value when said previous data transition is detected after its predicted detection time.

28. Apparatus for decoding phase encoded data according to claim 27 wherein said first and said second gate start counts are equal.

29. Apparatus for decoding phase encoded data according to claim 28 wherein said first, said second, and said third gate start count values are proportional to the predicted arrival time for said next data transition.

30. Apparatus for decoding phase encoded data having data transitions and phase transitions comprising
clock means for generating clock signals,
means for detecting data transitions,
a speed counter for generating a speed count signal indicative of the predicted time of detection of a data transition,
a bit time counter for generating a bit time signal indicative of the amount of time between the actual detection of a data transition and its predicted time of detection, said bit time counter starting at said speed count and decrementing said speed count under control of said clock signals, means responsive to said data for starting said bit time counter upon the detection of a data transition, means responsive to said bit time signal for changing said speed count in response to a running average of the bit time signals for the two immediately previous data transitions.

31. Apparatus for decoding phase encoded data according to claim 30 further comprising means for incrementing said speed count by a predetermined number if the running average of the difference between the bit times the two immediately previous data transitions is positive and decrementing said speed count by a predetermined number if the running average of the difference between the bit times the two immediately previous data transitions is negative.

32. Apparatus for decoding phase encoded data according to claim 31 wherein said predetermined number is larger when said decoding apparatus is attempting to synchronize to said data than when said apparatus is decoding data transitions.

33. Apparatus for decoding phase encoded data according to claim 32 wherein said detection means comprises a gate counter for generating gate count signals defining a time interval during which data transitions can be detected, said gate count signals starting at a programmable gate start count means responsive to said speed count signals and to said data transitions for changing said gate start count to vary the duration of said time interval for detection of one of said data transitions depending on the sign of the bit time signal.

34. Apparatus for decoding phase encoded data according claim 33 wherein said gate start count changing means changes said gate start count to a first value when said bit time signal is positive, said gate start count changing means changes said gate start count to a second value when said bit time signal is zero and said gate start count changing means changes said gate start count to a third value when said bit time signal is negative.

35. Apparatus for decoding phase encoded data according to claim 34 wherein said first and said second gate start count values are equal.

36. Apparatus for decoding phase encoded data according to claim 35 wherein said first, said second, and said third gate start count values are proportional to the speed count.

37. Apparatus for decoding phase encoded data according to claim 36 wherein said first gate start count value is a first predetermined percentage of said speed count; said second gate start count value is a second predetermined percentage of said speed count; and said third gate start count value is a third predetermined percentage of said speed count less a fourth value which is proportional to the amount of time which said previous transition was detected after its predicted detection time.

38. Apparatus for decoding phase encoded data according to claim 37 wherein said first predetermined percentage is 75%, said second predetermined percentage is 75% and said fourth predetermined percentage is 75%.

39. Apparatus for decoding phase encoded data according to claim 38 wherein said gate start count changing means changes said gate start count signal to a value equal to 25% of said speed count when a phase transition is detected.

* * * * *